(12) United States Patent
Kimba et al.

(10) Patent No.: US 7,072,050 B2
(45) Date of Patent: Jul. 4, 2006

(54) SUBSTRATE FILM THICKNESS MEASUREMENT METHOD, SUBSTRATE FILM THICKNESS MEASUREMENT APPARATUS AND SUBSTRATE PROCESSING APPARATUS

(75) Inventors: Toshifumi Kimba, Kanagawa-ken (JP); Shunsuke Nakai, Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 49 days.

(21) Appl. No.: 10/854,330

(22) Filed: May 27, 2004

(65) Prior Publication Data

US 2004/0223166 A1    Nov. 11, 2004

Related U.S. Application Data

(62) Division of application No. 09/734,737, filed on Dec. 13, 2000, now Pat. No. 6,785,010.

(30) Foreign Application Priority Data

Dec. 13, 1999   (JP) ................................. 11-353693
Oct. 16, 2000   (JP) ............................. 2000-315212

(51) Int. Cl.
    *G01B 11/28*   (2006.01)
(52) U.S. Cl. ............................. 356/630; 451/5; 451/8
(58) Field of Classification Search ........ 356/630–632;
    451/5, 6, 8, 41, 526, 287, 285; 438/16, 692,
    438/693, 697; 250/559.27
See application file for complete search history.

(56) References Cited

U.S. PATENT DOCUMENTS

| 5,081,796 | A | 1/1992 | Schultz |
| 5,099,614 | A | 3/1992 | Arai et al. ...................... 451/8 |
| 5,433,651 | A | 7/1995 | Lustig et al. |
| 5,609,511 | A | 3/1997 | Moriyama et al. ............. 451/5 |
| 5,657,123 | A | 8/1997 | Mogi et al. |
| 5,672,091 | A | 9/1997 | Takahashi et al. |
| 5,708,506 | A | 1/1998 | Birang ....................... 356/600 |
| 5,893,796 | A | 4/1999 | Birang et al. |
| 5,964,643 | A | 10/1999 | Birang et al. |

(Continued)

FOREIGN PATENT DOCUMENTS

| JP | 07-193033 | 7/1995 |
| JP | 07-285050 | 10/1995 |

(Continued)

*Primary Examiner*—Hoa Q. Pham
(74) *Attorney, Agent, or Firm*—Wenderoth, Lind & Ponack, L.L.P.

(57) ABSTRACT

A jet of water in a cylindrical form is supplied from a jet nozzle onto a measurement surface of a substrate to form a column of the water extending between the nozzle and the measurement surface. Light is emitted from an irradiation fiber and transmitted through the column of water to the measurement surface. The light reflected by the measurement surface is received by a light-receiving fiber through the column of water. A measurement calculation unit measures the thickness of a film formed on the substrate, based on the intensity of the reflected light.

18 Claims, 24 Drawing Sheets

U.S. PATENT DOCUMENTS

| | | | |
|---|---|---|---|
| 5,972,162 A | 10/1999 | Cesna | |
| 6,000,996 A | 12/1999 | Fujiwara | |
| 6,045,439 A | 4/2000 | Birang et al. | |
| 6,106,662 A | 8/2000 | Bibby et al. | 156/345.13 |
| 6,120,349 A | 9/2000 | Nyui et al. | 451/21 |
| 6,146,248 A | 11/2000 | Jairath et al. | 451/41 |
| 6,395,130 B1 | 5/2002 | Adams et al. | 156/345.13 |
| 6,599,765 B1 * | 7/2003 | Boyd et al. | 438/16 |
| 6,758,723 B1 * | 7/2004 | Kobayashi et al. | 451/6 |
| 6,785,010 B1 * | 8/2004 | Kimba et al. | 356/630 |

FOREIGN PATENT DOCUMENTS

| | | |
|---|---|---|
| JP | 09-085611 | 3/1997 |
| JP | 10-223578 | 8/1998 |
| JP | 10-335288 | 12/1998 |
| JP | 11-058225 | 11/1999 |
| JP | 2000-254860 | 9/2000 |
| WO | 99/64205 | 12/1999 |
| WO | 01/20304 | 3/2001 |

* cited by examiner

SUBSTRATE FILM THICKNESS MEASUREMENT METHOD, SUBSTRATE FILM THICKNESS MEASUREMENT APPARATUS AND SUBSTRATE PROCESSING APPARATUS

This is a divisional application of Ser. No. 09/734,737, filed Dec. 13, 2000, now U.S. Pat. No. 6,785,010.

BACKGROUND OF THE INVENTION

The present invention relates to a method and an apparatus for measuring the thickness of a film on a substrate, and a substrate processing apparatus utilizing the same. The method and apparatuses of the present invention can be advantageously employed especially in effecting real-time detection and monitoring of a film thickness of a substrate on a side being processed during processing. It should be noted that "measurement of a film thickness of a substrate" in the present invention means not only measurement of a film thickness of a substrate, but also detection or observation of a condition of the substrate, such as the presence or absence of a metallic thin film formed on the substrate.

As a conventional technique of the above-mentioned type, Unexamined Japanese Patent Application Public Disclosure (Kokai) No. 7-251371 discloses the technique of emitting light from a distal end of a glass fiber to a measurement surface of a substrate during polishing, and receiving the light reflected by the measurement surface through the glass fiber. The glass fiber guides the reflected light to a film thickness measurement control unit.

In the above-mentioned technique of emitting and receiving light through a glass fiber, a measurement error is likely to occur due to the presence of drops of liquid formed on the substrate during polishing. Further, it is required to strictly control the distance between the distal end of the glass fiber and the measurement surface of the substrate.

Unexamined Japanese Patent Application Public Disclosure (Kokai) No. 10-264017 discloses the technique of placing a polished substrate in a cleaning liquid in a cleaning tank, inserting a distal end of an optical fiber into the cleaning liquid and bringing it to a position in the vicinity of a measurement surface of a substrate. Those steps are followed by emitting light to the measurement surface, and introducing the light reflected by the measurement surface through the optical fiber to a film thickness detection apparatus.

In the above-mentioned method of placing the distal end of the optical fiber in the cleaning liquid, it is necessary to control the distance between the distal end of the optical fiber and the measurement surface of the substrate. Further, a large apparatus is required.

SUMMARY OF THE INVENTION

In view of the above, the present invention has been made. It is an object of the present invention to provide a method and an apparatus for measuring the thickness of a film formed on a substrate, and a substrate processing apparatus utilizing the same, which have simple arrangements and are capable of effecting real-time and highly accurate measurement of a film thickness of a substrate during processing, such as polishing.

In accordance with an aspect of the present invention, there is provided a method for measuring a thickness of a film on a substrate comprising directing a jet of a light-transmitting liquid towards the film to form a column of the light-transmitting liquid reaching the film, directing a light through the column of the light-transmitting liquid towards said film, receiving the light reflected from the film through the column of the light-transmitting liquid, and measuring the thickness of said film upon receipt of the light reflected from the film. The diameter of the column may be uniform.

In accordance with another aspect of the present invention, there is provided an apparatus for measuring a thickness of a film on a substrate comprising a first conduit having a distal end (i.e., an end closest to the film), which is directed to and spaced away from the film. The first conduit discharges a jet of a light-transmitting liquid from the distal end thereof towards the film to form a column of the light-transmitting liquid extending between the distal end of the first conduit and the film, the diameter of the column being uniform A light emitter is provided for emitting light toward the film through the column of the light-transmitting liquid, and a light receiver is provided for receiving the light reflected from the film through the column of the light-transmitting liquid to enable measurement of the thickness of the film on the basis of the light reflected from the film.

The light emitter may comprise a light-emitting optical fiber having a distal end (i.e., an end closest to the film) directed to the film to direct the light towards the film through the column of the light-transmitting liquid. Further, the light receiver may comprise a light-receiving optical fiber having a distal end (i.e., an end closest to the film) directed to the film to receive the light reflected from the film. The optical fibers of the light emitter and the light receiver may also be integrally formed so that only a single light emitting/light transmitting optical fiber is provided.

Alternatively, the first conduit may be provided with a light transmitting member such a lens liquid-tightly separating the inside and outside of the first conduit, and an optical system provided outside the first conduit and optically connected to the first conduit so as to direct light from the optical system through the light transmitting member provided on the first conduit so that the optical system can direct the light towards the film through the first conduit and the column of the light transmitting liquid. The first conduit may further be provided with an optical system provided outside the first conduit and optically connected to the conduit so as to receive the light reflected from the film through the column of the light-transmitting liquid, the first conduit and the light transmitting member.

The film thickness measurement apparatus may further comprise a second conduit inside of which the first conduit is positioned so that the second conduit receives the light-transmitting liquid which has impinged on the film and radially spread. The second conduit may be connected to a pump to draw the light transmitting liquid spread radially.

In accordance with a further aspect of the present invention, there is provided an apparatus for treating a substrate bearing a film on the surface of the substrate comprising a holder for holding a semiconductor wafer, and a film thickness measurement device constructed as stated above. The substrate treating apparatus may be a polishing apparatus for polishing a substrate. The polishing apparatus comprises a turntable having a polishing surface and a substrate holder for keeping a substrate in contact with the polishing surface to polish the substrate, in which the first and second conduits are provided through the turntable. The second conduit opens at the polishing surface so as to be sealed from the outside thereof by the polishing surface engaged with the substrate, and the first conduit has the distal end spaced from the substrate engaging with the polishing surface. There may also be provided a plurality of sets of the first and second conduits.

When the diameter of the column of the light-transmitting liquid is made uniform, the size of a measurement spot formed on the film or measurement surface is determined, regardless of the distance between the distal end of the first conduit, through which the light-transmitting liquid is emitted towards the film, and the film.

In accordance with a further aspect of the present invention, there is provided an apparatus for polishing a substrate comprising a turntable having a polishing surface and an axis for rotation. A substrate holder holds a substrate having a film on its surface so that the film is engaged with the polishing surface. A film thickness measurement device comprises a light emitter for emitting light toward the film, a light receiver for receiving the light reflected from the film to enable measurement of the thickness of the film on the basis of the light reflected from the film, and an optical system having an optical path extending through the turntable from the center of the turntable to a predetermined radial position in the turntable. The optical path includes a proximal end opening in the polishing surface and extending axially, and a distal end opening in the polishing surface at the predetermined radial position so that the light from the light emitter is introduced into the optical path through the proximal end, lead to the distal end and directed to the film and the light reflected from the film is returned to the proximal end to exit the optical path to enable the optical receiver to receive the reflected light.

The foregoing and other objects, features and advantages of the present invention will be apparent from the following detailed description and appended claims taken in connection with the accompanying drawings.

In the following detailed description, certain specific terminology will be employed for the sake of clarity, and a particular embodiment is described. However, it is to be understood that the same is not intended to be limiting and should not be so constructed inasmuch as the invention is capable of taking many forms and variations within the scope of the appended claims.

DETAILED DESCRIPTION OF THE INVENTION

Figure 1:
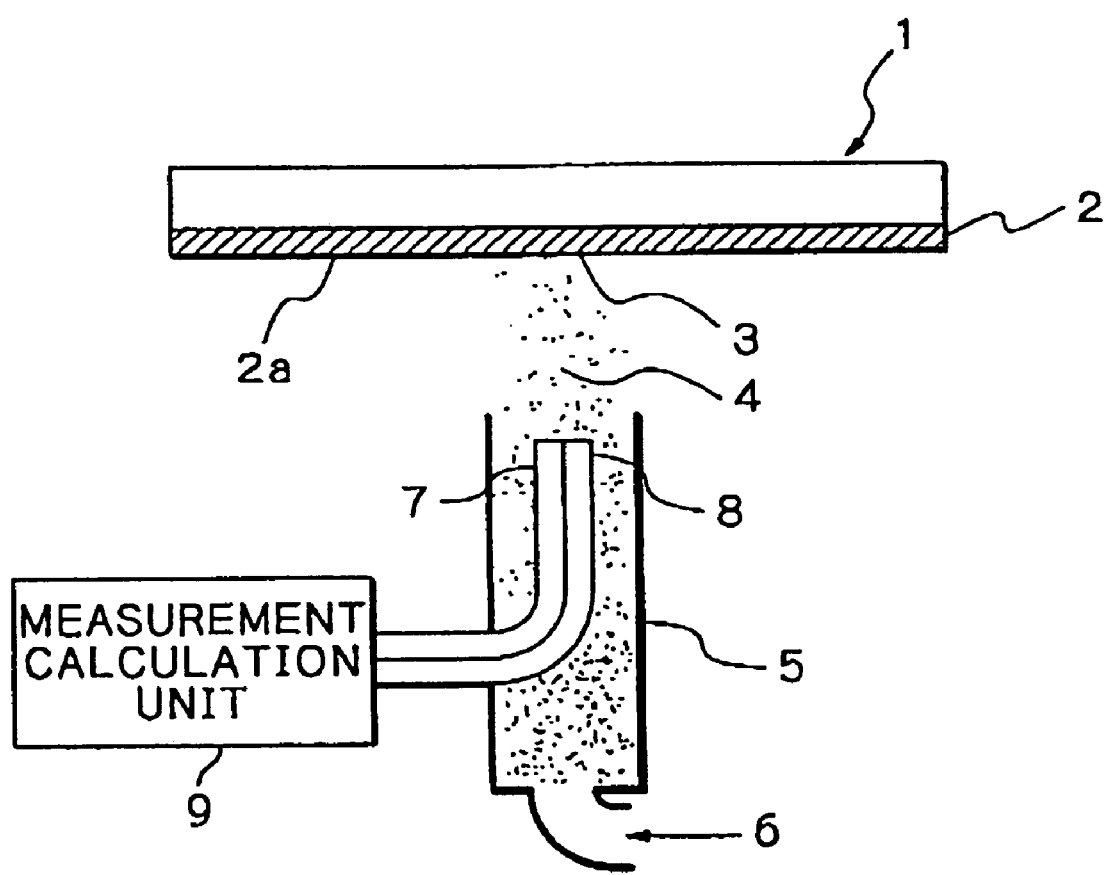
FIG. 1 shows an example of a general arrangement of a substrate film thickness measurement apparatus of the present invention.

Embodiments of the present invention are described below, with reference to the drawings. FIG. 1 shows a general arrangement of a substrate film thickness measurement apparatus of the present invention. In FIG. 1, reference numeral 1 denotes a substrate having a thin film 2 formed thereon. Reference numeral 5 denotes a jet nozzle for supplying a jet of water in a cylindrical form onto a surface 2a of the substrate 1 on a side to be processed. Respective distal end (i.e., the end closest to the film 2) portions of a light-emitting optical fiber 7 and a light-receiving optical fiber 8 are provided within the jet nozzle 5.

In the above-mentioned substrate film thickness measurement apparatus, pressurized water 6 is supplied to the jet nozzle 5. A water jet 4 is supplied in a cylindrical form having a small diameter from a distal end of the jet nozzle 5 onto a predetermined position on the surface 2a of the substrate 1, to thereby form a measurement spot 3. In this state, light is emitted from a measurement calculation unit 9 through the irradiation light-transmitting fiber 7 into the water jet 4. The light passes through the water jet 4 to a measurement surface in the measurement spot 3 on the substrate 1. It is preferred that an optical axis of the light passing through the water jet 4 be substantially perpendicular to the measurement surface, in terms of a structure of the apparatus. If desired, the optical axis may be positioned obliquely relative to the measurement surface, as long as the light (from the irradiation fiber) reflected by the measurement surface can be received by the light-receiving fiber 8.

The reflected light from the surface 2a is guided through the water jet 4 and the light-receiving fiber 8 to the measurement calculation unit 9. In the measurement calculation unit 9, the thickness of the film 2 is measured, based on the reflected light. An inner surface of the jet nozzle 5 is mirror-finished so that the emitted light and the reflected light are efficiently guided to the irradiation fiber 7 and the light-receiving fiber 8, respectively.

Figure 2:
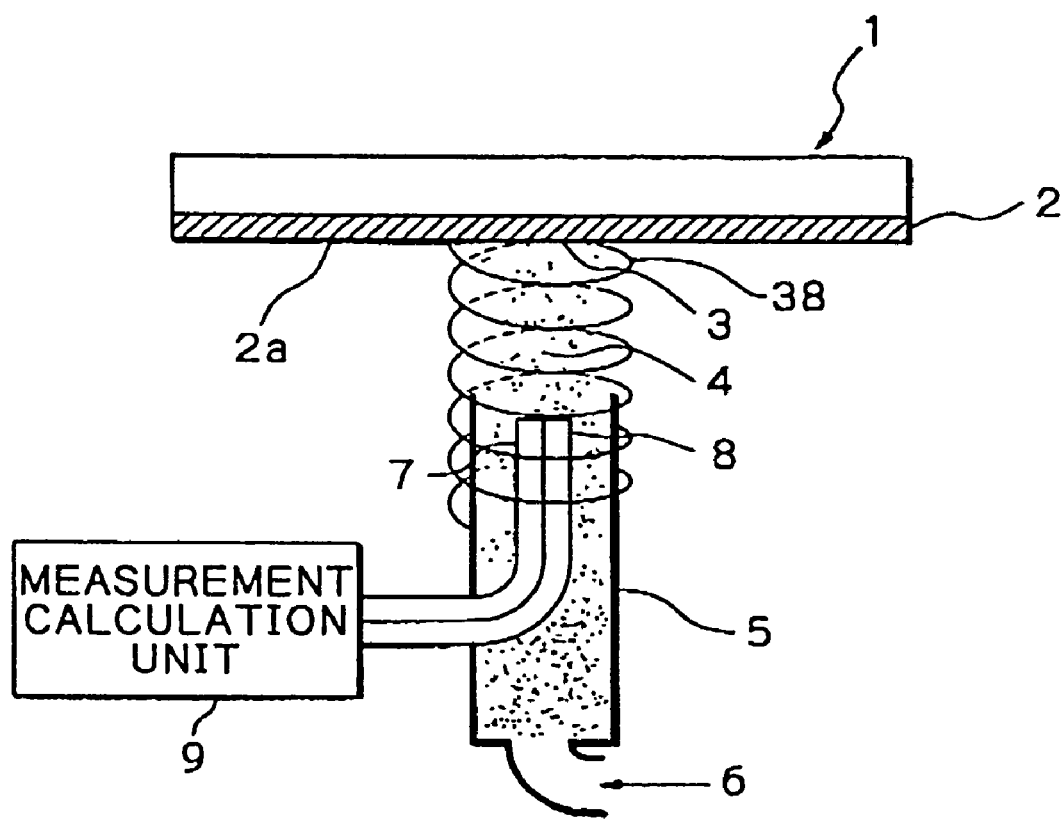
FIG. 2 shows an example of a general arrangement of a substrate film thickness measurement apparatus of the present invention.
Figure 4:
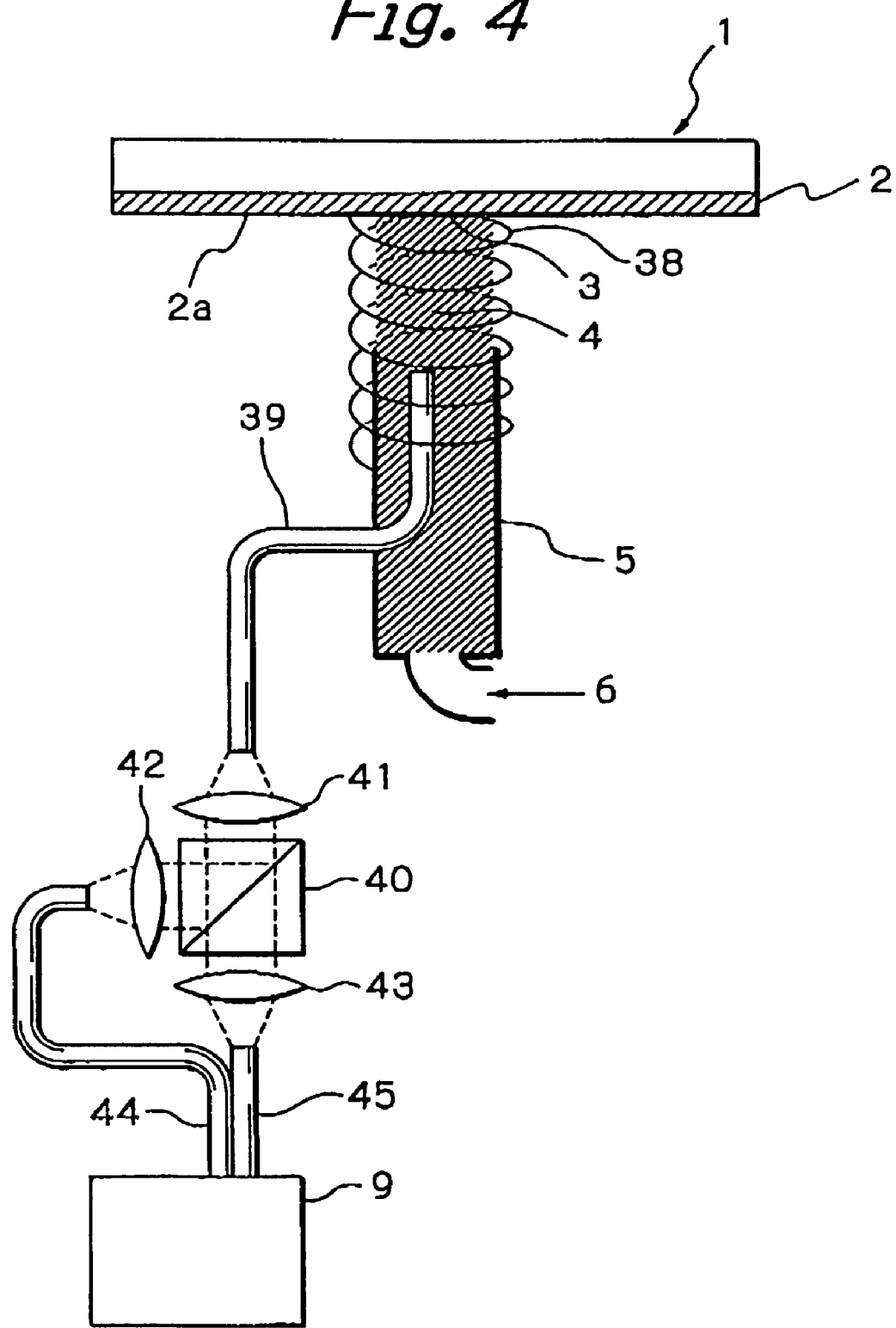
FIG. 4 shows an example of a general arrangement of a substrate film thickness measurement apparatus of the present invention.

In some cases, water does not smoothly flow on the measurement surface where the water jet 4 makes contact with the film 2, whereby the measurement spot 3 becomes unstable. Therefore, as shown in FIG. 2, it is preferred to provide a draining member 38 in a spiral form which extends from the jet nozzle 5 to the measurement spot 3 on the film 2 so as to enable smooth discharge of water after contact with the film 2. A means to enable smooth discharge of water may be provided when the water jet 4 is positioned obliquely relative to the substrate or in a mechanism in which the water jet 4 is supplied in an upward or downward direction. As the draining member, a member such as shown in FIGS. 2 and 4 having a spring-like configuration and utilizing a surface tension of water can be used. Alternatively, a suction nozzle which surrounds the jet nozzle 5 may be used, although such a suction nozzle is not shown.

In the above-mentioned substrate film thickness measurement apparatus, when the distance between the distal end of the jet nozzle 5 and the surface 2a is small (an experiment has been conducted by setting the inner diameter of the jet nozzle 5 to 700 μm and the length of the water jet 4 to 30 mm or less), the diameter of the water jet 4 is substantially uniform. Therefore, the size of the measurement spot 3 on the surface 2a is determined, regardless of the distance between the respective distal ends of the jet nozzle 5 and the irradiation fiber 7 and the surface 2a, thus eliminating the need to effect strict control of the above-mentioned distance.

Figure 3:
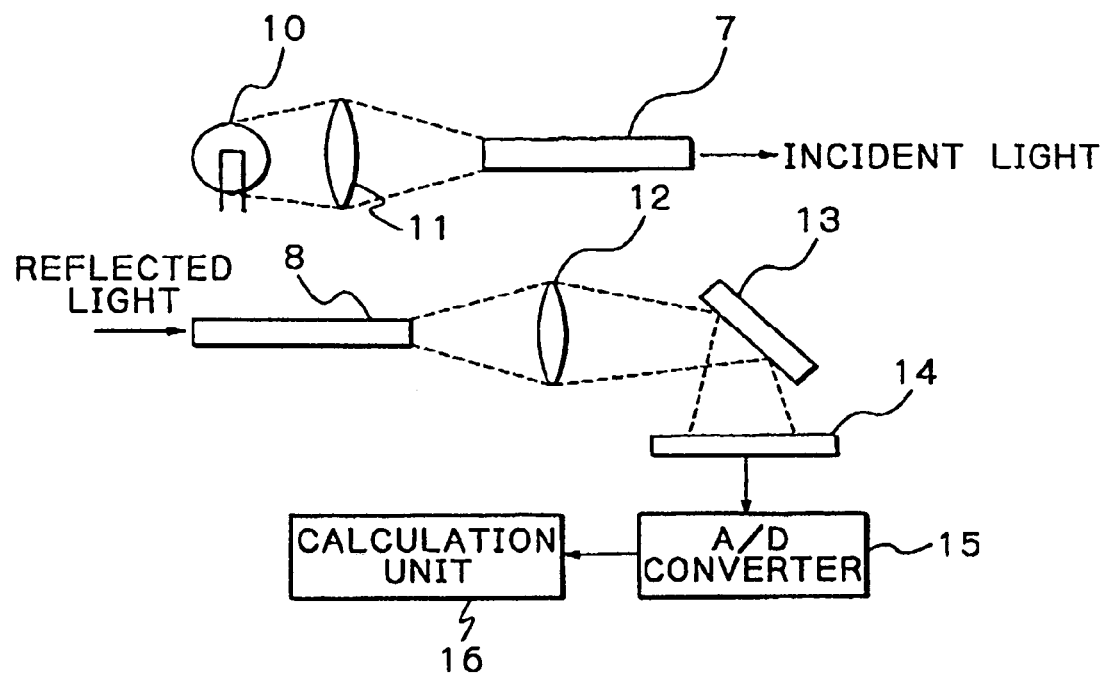
FIG. 3 shows an example of an arrangement of a measurement calculation unit of a substrate film thickness measurement apparatus of the present invention.

FIG. 3 shows an arrangement of the measurement calculation unit 9. The measurement calculation unit 9 in this example is used when the film 2 on the substrate 1 is an oxide film [such as a silicon oxide ($SiO_2$) film]. In FIG. 3, light emitted from a halogen light source 10 passes through a first lens 11 and enters the irradiation fiber 7. The light then passes through the distal end of the irradiation fiber 7 and the water jet 4 (see FIG. 1) and is transmitted to the surface 2a of the substrate 1. The light reflected by the surface 2a is guided through the light-receiving fiber 8 and a second lens 12 and reaches a diffraction grating 13, where the light is dispersed. The dispersed light is detected by a CCD line sensor 14 as a spectral reflection intensity relative to the wavelength. An A/D converter 15 converts the spectral reflection intensity into a digital signal, which is transmitted to a calculation unit 16.

In the substrate film thickness measurement apparatus in FIGS. 1 and 2, two optical fibers, namely, the irradiation fiber 7 and the light-receiving fiber 8, are inserted into the jet nozzle 5. However, as shown in FIG. 4, a single irradiation/light-receiving synthetic fiber 39 may be inserted into the jet nozzle 5.

In FIG. 4, reference numeral 40 denotes a beam splitter; 41, 42 and 43 lenses; 44 an irradiation fiber; and 45 a light-receiving fiber. Light from the measurement calculation unit 9 is emitted to the measurement surface at the measurement spot 3 on the substrate 1 through the irradiation fiber 44, the lens 42, the beam splitter 40, the lens 41, the irradiation/light-receiving synthetic fiber 39 and the waterjet 4. The light reflected by the measurement surface is guided to the measurement calculation unit 9 through the water jet 4, the light emitting/light-receiving synthetic optical fiber 39, the lens 41, the beam splitter 40, the lens 43 and the light-receiving fiber 45.

To measure the film thickness of the substrate, a spectral reflectance ratio is preliminarily determined with respect to the substrate 1 having no thin film formed thereon. While the substrate 1 is processed, the apparatus is mechanically controlled so that a predetermined measurement point is periodically measured, to thereby conduct measurement of the spectral reflectance ratio of the thin film periodically at the predetermined measurement point.

Figure 5:
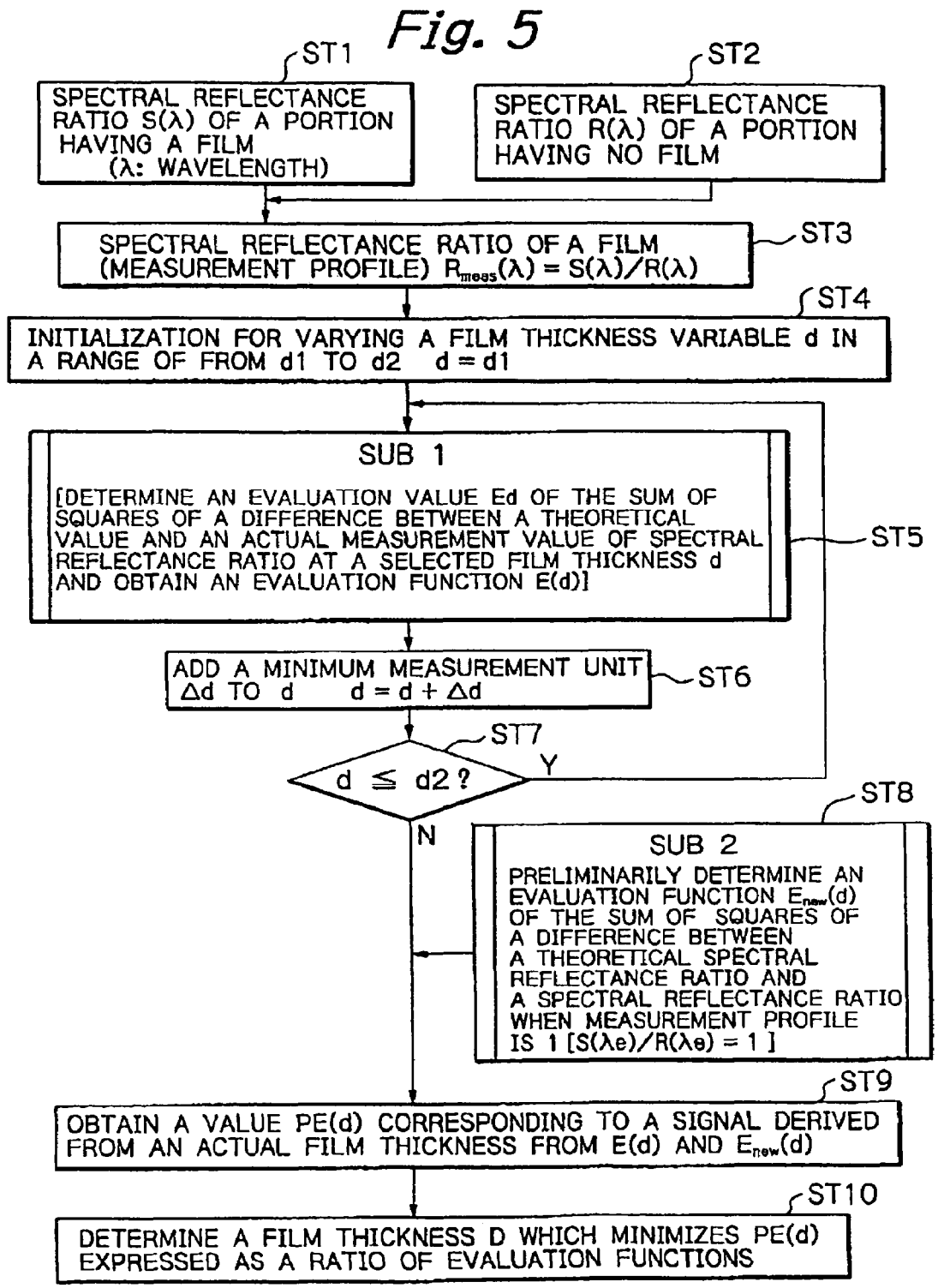
FIG. 5 shows a flow of a film thickness calculation operation of a substrate film thickness measurement apparatus of the present invention.
Figure 21:
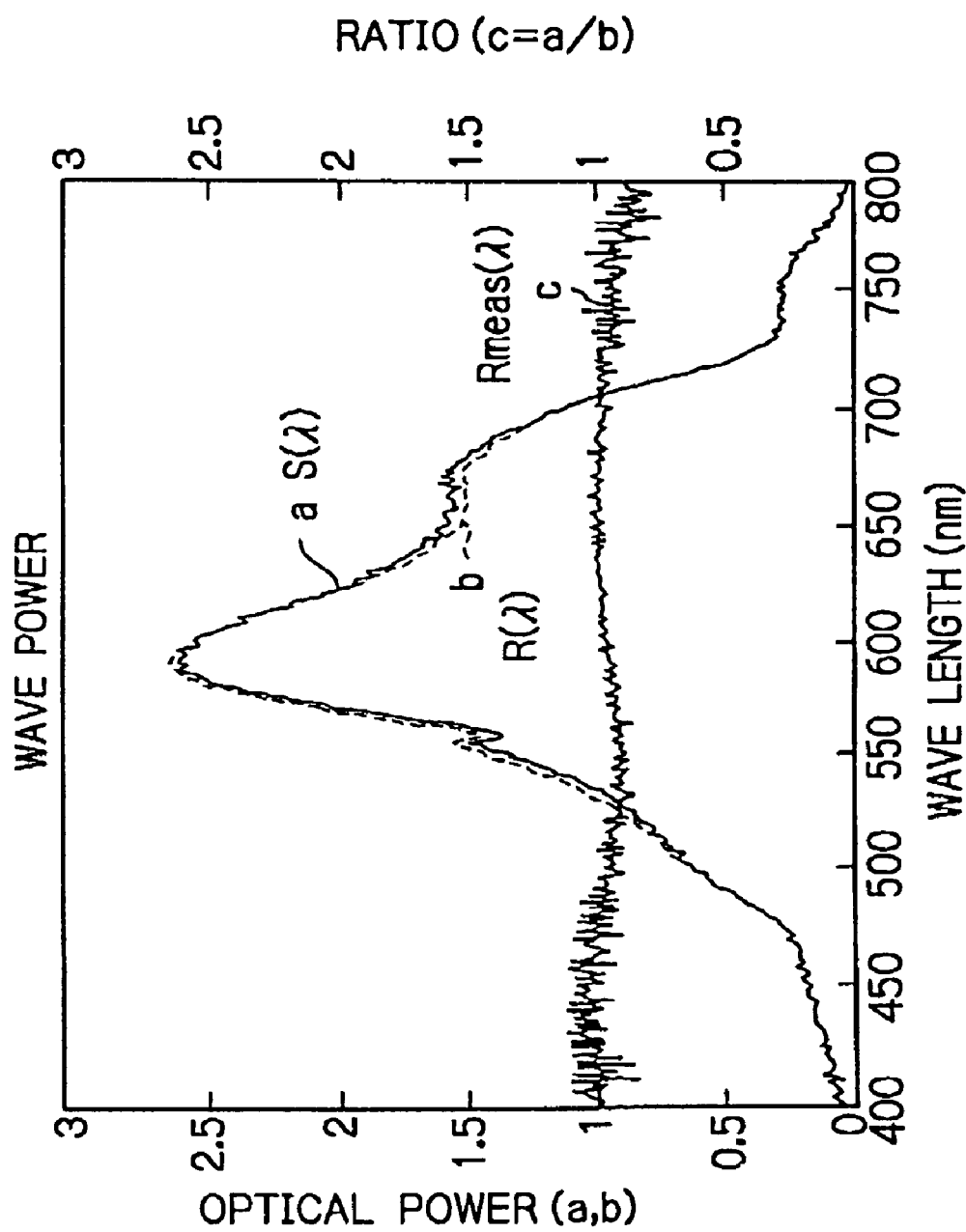
FIG. 21 is a graph indicating a spectral reflectance ratio of a portion having a measurement film and a spectral reflectance ratio of a portion having no measurement film.

FIGS. 5 to 8 show flow charts of a film thickness calculation operation by the substrate film thickness measurement apparatus of the present invention. Referring to FIG. 5, a spectral reflectance ratio $S(\lambda)$ is determined from a spectral reflection intensity of a measurement point on the substrate (a portion having a film formed thereon) (see a curve a of FIG. 21) (step ST1), and a spectral reflectance ratio $R(\lambda)$ is determined from a spectral reflection intensity of a portion having no film formed thereon (see a curve b of FIG. 21) (step ST2). Then, a spectral reflectance ratio of the film [=a measurement profile $R_{meas}(\lambda)$] is determined by division [$R_{meas}(\lambda)=S(\lambda)/R(\lambda)$] (see a curve c of FIG. 21) (step ST3). $\lambda$ represents an optical wavelength. The curves a and b in FIG. 21 are, for example, curves obtained when the reflected light exhibits a continuous spectrum with respect to the wavelength in the case of a halogen lamp being used as an incident light source.

In order to determine a film thickness D, a variable d of the film thickness is varied within a range of from d1 to d2 which is considered as including an actual film thickness. First, d is initialized (d=d1) (step ST4), and determination is made with respect to an evaluation value Ed of the sum of squares of a difference between a theoretical value $R_{calc}(\lambda)$ and an actual measurement value $R_{meas}(\lambda)$ of the spectral reflectance ratio at a selected value d, to thereby obtain an evaluation function E(d) (step ST5). A minimum measurement unit Δd is added to d (d=d+Δd) (step ST6). Subsequently, an inquiry is made with regard to whether or not d is equal to or smaller than d2 (d d2) (step ST7). If the answer is YES (d d2), the program returns to step ST5, and steps ST6 and ST7 are repeated.

Figure 22:
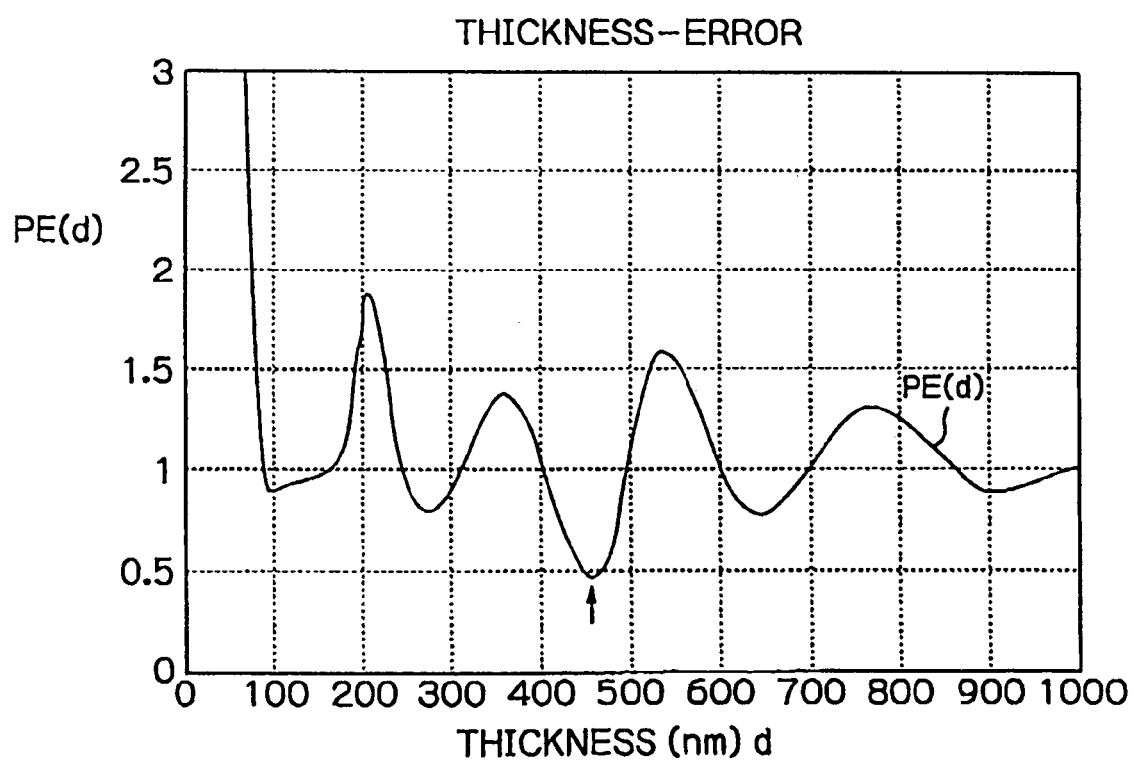
FIG. 22 is a graph showing an evaluation function of a theoretical value and an actual measurement value of a spectral reflectance ratio with respect to a film thickness.

If the answer is NO, from an evaluation function $E_{new}(d)$ of the sum of squares of a difference between a theoretical spectral reflectance ratio $R_{calc}(\lambda e)$ and the spectral reflectance ratio when the measurement profile is 1 [S(λe)/R(λe)=1], which evaluation function $E_{new}(d)$ is preliminarily determined in step ST8, a value PE(d) corresponding to a signal derived from the film thickness is obtained, in accordance with the formula PE(d)=E(d)/$E_{new}(d)$ (step ST9). The film thickness d which minimizes the value of PE(d) expressed as a ratio of the evaluation functions is determined as the film thickness D (see FIG. 22) (step ST10). In this example, the film thickness D is about 460 nm as indicated in FIG. 22. In an actual operation, the film thickness D is determined automatically by the calculation unit 16 in accordance with comparison calculation of the film thickness d which minimizes the value of PE(d) expressed as a ratio of the evaluation functions, without producing such a graph as shown in FIG. 22.

Figure 6:
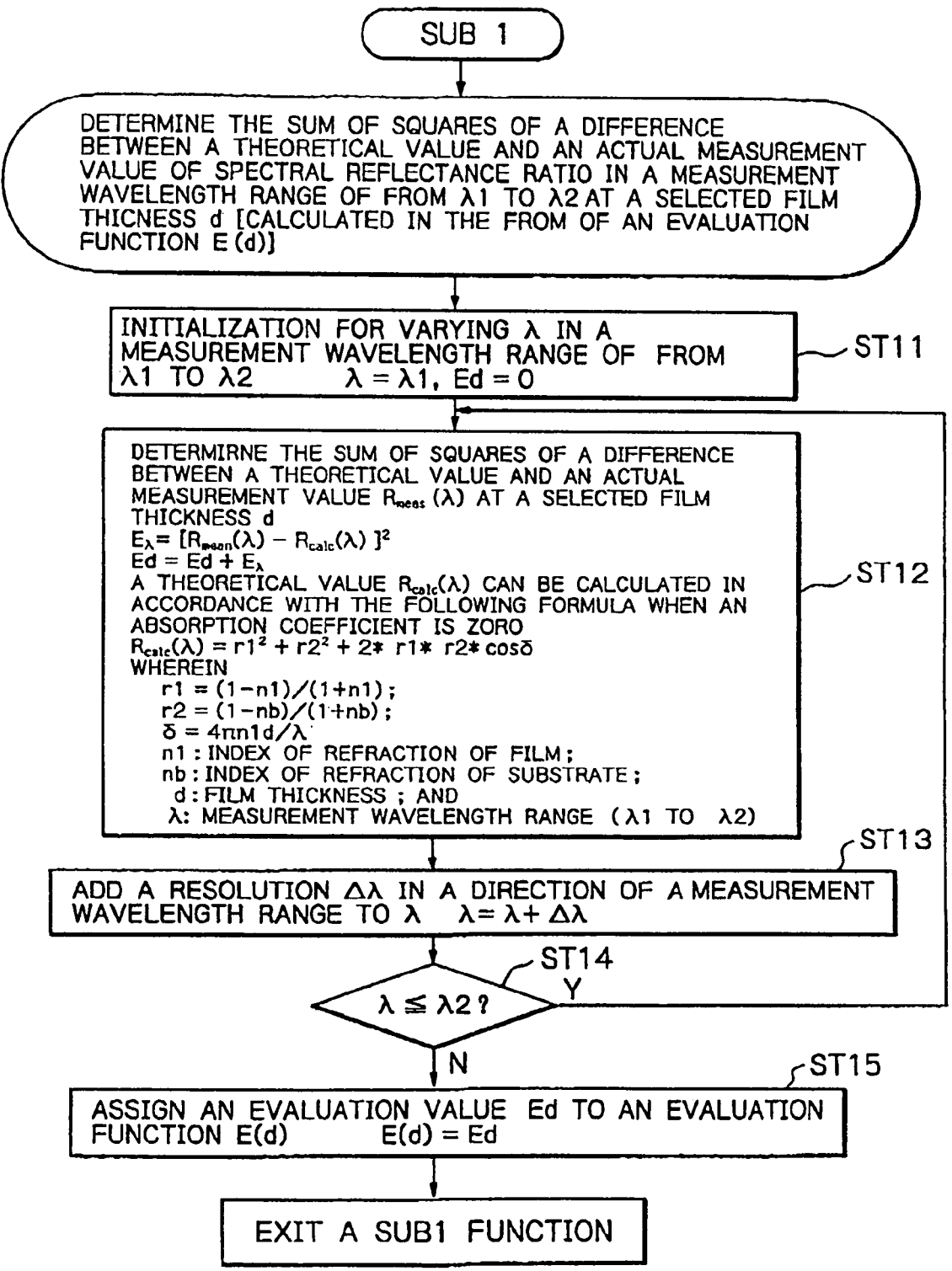
FIG. 6 shows a flow of a film thickness calculation operation of a substrate film thickness measurement apparatus of the present invention.

FIG. 6 shows a flow chart of an operation in step ST5 in FIG. 5 for determining the evaluation value Ed from the sum of squares of a difference between the theoretical value $R_{calc}(\lambda)$ and the actual measurement value $R_{meas}(\lambda)$ of spectral reflectance ratio at a selected film thickness d in a measurement wavelength range of from λ1 to λ2 and obtaining the evaluation function E(d). First, initialization is conducted for varying the wavelength λ in the measurement wavelength range of from λ1 to λ2 (λ=λ1, Ed=0) (step ST11).

Next, the evaluation value Ed is determined in accordance with the following calculation (step ST12). Determination is made with regard to the sum of squares of a difference between the theoretical value $R_{calc}(\lambda)$ and the actual measurement value $R_{meas}(\lambda)$ at the selected film thickness d.

$$E\lambda = [R_{meas}(\lambda) - R_{calc}(\lambda)]^2$$

$$Ed = Ed + E_\lambda$$

When it is assumed that an absorption coefficient is zero, the theoretical value $R_{calc}(\lambda)$ can be determined in accordance with the following formula.

$$R_{calc}(\lambda) = r1^2 + r2^2 + 2 \times r1 \times r2 \times \cos\delta,$$

wherein
r1=(1−n1)/(1+n1);
r2=(1−nb)/(1+nb);
δ=4πn1d/λ;
n1: index of refraction of the film;
nb: index of refraction of the substrate;
d: film thickness; and
λ: measurement wavelength range (λ1 to λ2).

Subsequently, a resolution Δλ in a direction of the measurement wavelength range is added to λ (λ=λ+Δλ) (step ST13). Subsequently, an inquiry is made with regard to whether or not λ is equal to or smaller than λ2 (λ<λ2) (step ST14). If the answer is YES (λ<λ2), the program returns to step ST12 and steps ST13 and ST14 are repeated. If the answer is NO, the evaluation value Ed is assigned to the evaluation function E(d) [E(d)=Ed] (step ST15), and the program advances to step ST6 in FIG. 5.

Figure 7:
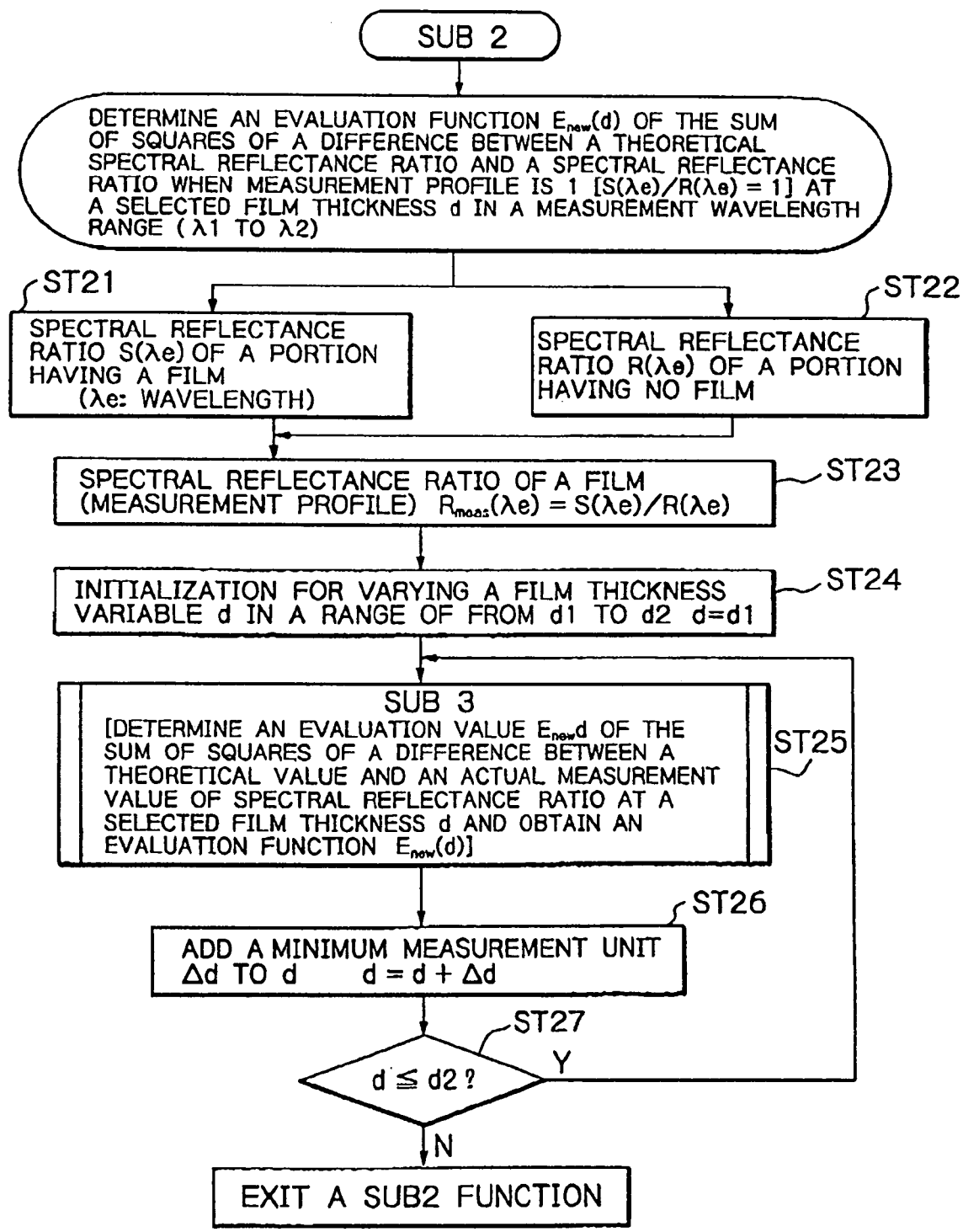
FIG. 7 shows a flow of a film thickness calculation operation of a substrate film thickness measurement apparatus of the present invention.

FIG. 7 shows a flow chart of an operation in step ST8 in FIG. 5 for determining the evaluation function $E_{new}(d)$ of the sum of squares of a difference between the theoretical spectral reflectance ratio $R_{calc}(\lambda e)$ and the spectral reflectance ratio when the measurement profile is 1 [S(λe)/R(λe)=1] in a film thickness selecting range (d1≦d≦d2). In FIG. 7, in steps ST21 to ST23, it is assumed that the spectral reflectance ratio S(λe) of a portion having the film formed thereon and R(λe) of a portion having no film formed thereon are equal to each other so that the measurement profile is 1 [S(λe)/R(λe)=1].

The film thickness variable d is varied within the range of from d1 to d2 which is considered as including an actual film thickness. First, d is initialized (d=d1) (step ST24). A determination is made with respect to an evaluation value $E_{new}$d of the sum of squares of a difference between the theoretical value $R_{calc}(\lambda e)$ and the spectral reflectance ratio when the measurement profile is 1 [S(λe)/R(λe)=1] at a selected film thickness d, to thereby obtain an evaluation function $E_{new}(d)$ (step ST25). The minimum measurement unit Δd is added to d (d=d+Δd) (step ST26). Subsequently, an inquiry is made with regard to whether or not d is equal to or smaller than d2 (d≦d2) (step ST27). If the answer is YES (d≦d2), the program returns to step ST25, and steps ST26 and ST27 are repeated. If the answer is NO, the program advances to step ST9 in FIG. 5 (exits a SUB2 function).

Figure 8:
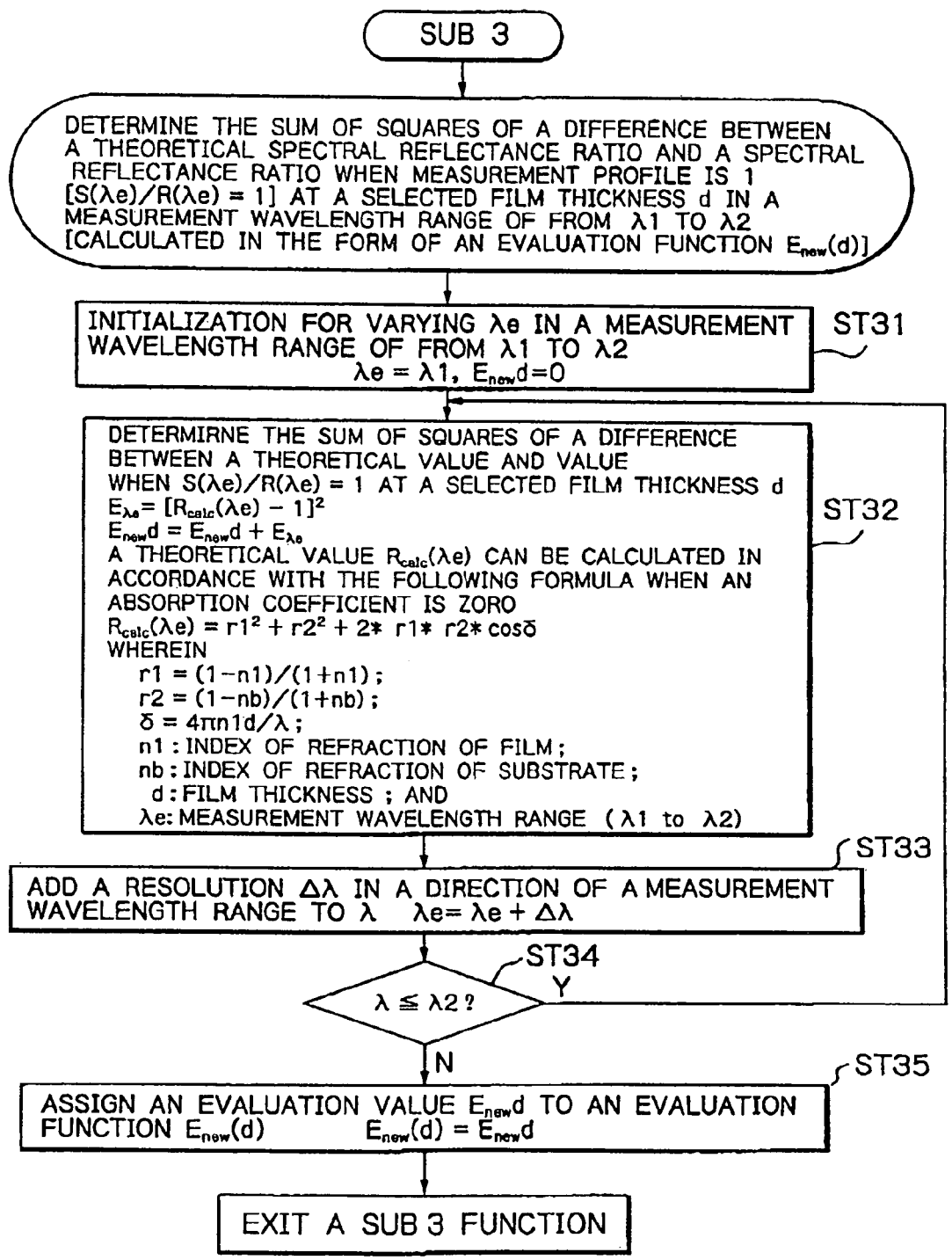
FIG. 8 shows a flow of a film thickness calculation operation of a substrate film thickness measurement apparatus of the present invention.

FIG. 8 shows a flow chart of an operation in step ST25 in FIG. 7 for determining the evaluation value $E_{new}$d of the sum of squares of a difference between the theoretical spectral reflectance ratio $R_{calc}(\lambda e)$ and the spectral reflectance ratio when the measurement profile is 1 [S(λe)/R(λe)=1] at the selected film thickness d in the measurement wavelength range of from λ1 to λ2 and obtaining the evaluation function $E_{new}(d)$. First, initialization is conducted for varying the wavelength λe in the measurement wavelength range of from λ1 to λ2 (λe=λ1, $E_{new}$d=0) (step ST31).

A determination is made with respect to the sum of squares of a difference between the theoretical value $R_{calc}(\lambda e)$ and the spectral reflectance ratio when the measurement profile is 1 [S(λe)/R(λe)=1] at the selected film thickness d (step ST32).

$$E_{\lambda e} = [R_{calc}(\lambda e) - 1]^2$$

$$E_{new}d = E_{new}d + E_{\lambda e}$$

When it is assumed that the absorption coefficient is zero, the theoretical value $R_{calc}(\lambda e)$ can be determined in accordance with the following formula.

$$R_{calc}(\lambda e) = r1^2 + r2^2 + 2 \times r1 \times r2 \times \cos\delta,$$

wherein
r1=(1−n1)/(1+n1);
r2=(1−nb)/(1+nb);
δ32 4πn1d/λe;
n1: index of refraction of the film;
nb: index of refraction of the substrate;
d: film thickness; and
λe: measurement wavelength range (λ1 to λ2).

Subsequently, the resolution Δλ in a direction of the measurement wavelength range is added to λe (λe=λe+Δλ) (step ST33). Subsequently, an inquiry is made with regard to whether or not λe is equal to or smaller than λ2 (λe≦λ2) (step ST34). If the answer is YES (λe≦λ2), the program returns to step ST32, and steps ST33 and ST34 are repeated. If the answer is NO, the evaluation value $E_{new}$d is assigned to the evaluation function $E_{new}(d)$ [$E_{new}(d)=E_{new}$d] (step ST35), and the program advances to step ST26 in FIG. 7 (exits a SUB3 function).

Figure 9:
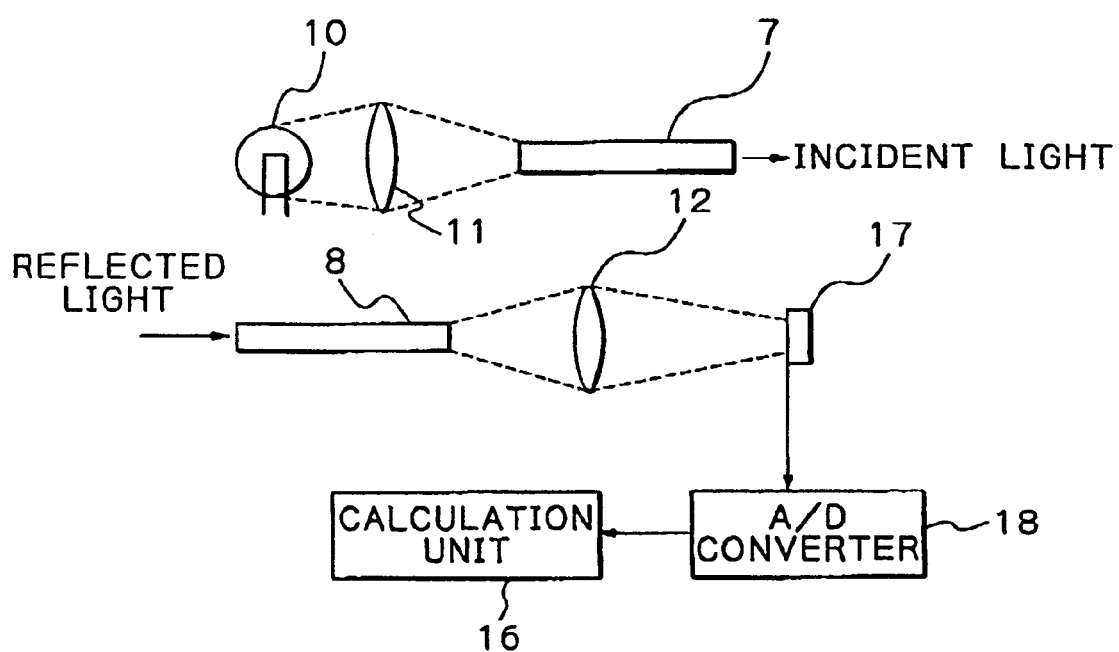
FIG. 9 shows an example of an arrangement of a measurement calculation unit of a substrate film thickness measurement apparatus of the present invention.

FIG. 9 shows the measurement calculation unit 9 arranged for detecting a condition of a substrate being processed when a metallic film is formed on the substrate. In FIG. 9, light emitted from the halogen light source 10 is transmitted through the first lens 11 and the irradiation fiber 7, and is emitted from the distal end of the irradiation fiber 7 through the water jet 4 to the measurement surface of the substrate 1. The light reflected by the measurement surface passes through the light-receiving fiber 8 and the second lens 12, and is guided to a light intensity detecting element (such as a photodiode) 17. In the light intensity detecting element 17, the light is detected as a light intensity, which is converted into a digital signal by an A/D converter 18 and transmitted to the calculation unit 16.

When the metallic film has a large thickness, most of the light is not transmitted through but is reflected by the film. During processing, the metallic film is gradually removed. When the absence of metallic film on the substrate is detected, an endpoint for processing can be detected simply by using the light intensity, rather than by using the spectral reflectance ratio. When the spectral reflectance ratio varies, depending on the presence or absence of metallic film, it is possible to determine the presence or absence of metallic film based on not only the light intensity, but also variations in spectral reflectance ratio.

Figure 10:
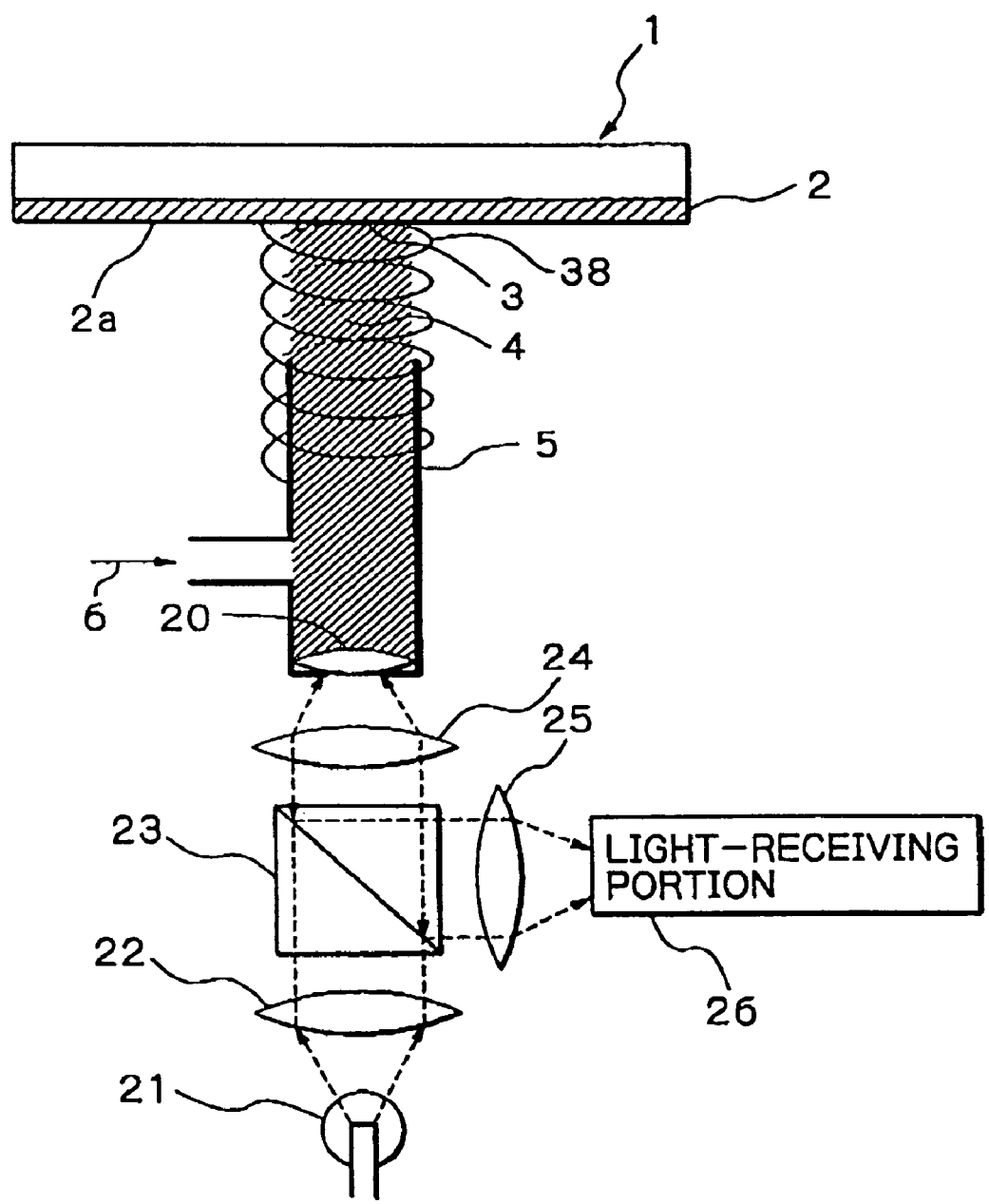
FIG. 10 shows an example of a general arrangement of a substrate film thickness measurement apparatus of the present invention.

FIG. 10 shows another example of an arrangement of a substrate film thickness measurement apparatus of the present invention. In FIG. 10, the thin film 2 is formed on the substrate 1 and a jet of water is supplied from the jet nozzle 5 onto the surface 2a of the substrate 1 on a side to be processed. A lens 20 is liquid-tightly connected to a lower end of the jet nozzle 5, thus preventing leakage of water. The pressurized water 6 is transferred to the jet nozzle 5 and supplied in the form of the cylindrical waterjet 4 having a small diameter from the distal end of the jet nozzle 5 onto a predetermined position of the surface 2a of the substrate 1, thereby forming the measurement spot 3.

Light from a halogen light source 21 is transmitted through a lens 22, a beam splitter 23 and a lens 24 to the lens 20 on the lower end of the jet nozzle 5. The light is then transmitted through the water jet 4 onto the surface 2a in the measurement spot 3 on the substrate 1. The light reflected by the surface 2a passes through the water jet 4, the lens 20 and the lens 24 to the beam splitter 23. The light is divided by the beam splitter 23 and guided through a lens 25 to a light-receiving portion 26. The light-receiving portion 26 comprises the diffraction grating 13, the CCD line sensor 14, the A/D converter 15 and the calculation unit 16 as shown in FIG. 3, or comprises the light intensity detecting element 17, the A/D converter 18 and the calculation unit 16 as shown in FIG. 9.

Figure 11:
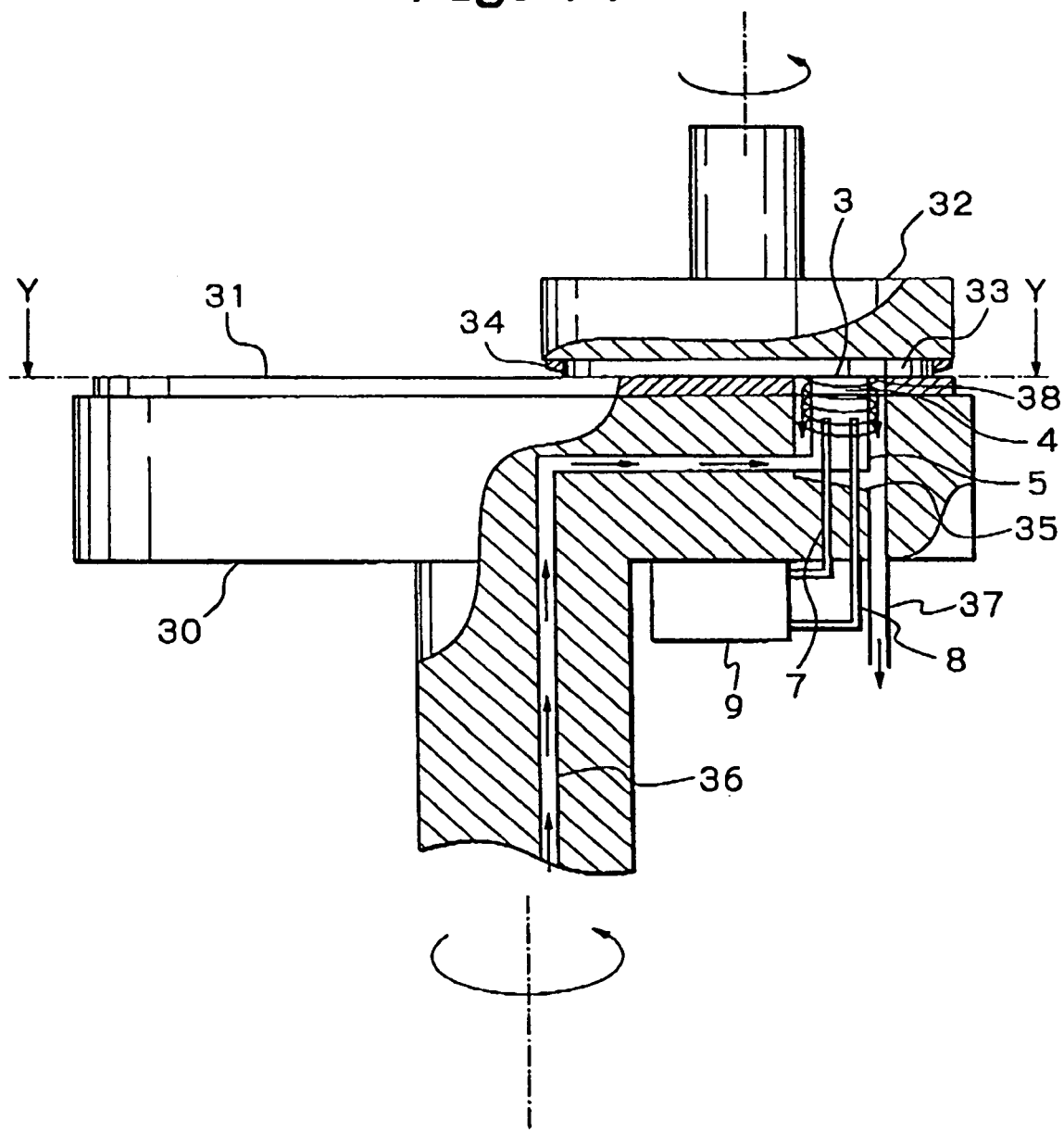
FIG. 11 shows an example of an arrangement of a substrate polishing apparatus in which a substrate film thickness measurement apparatus of the present invention is provided.
Figure 12:
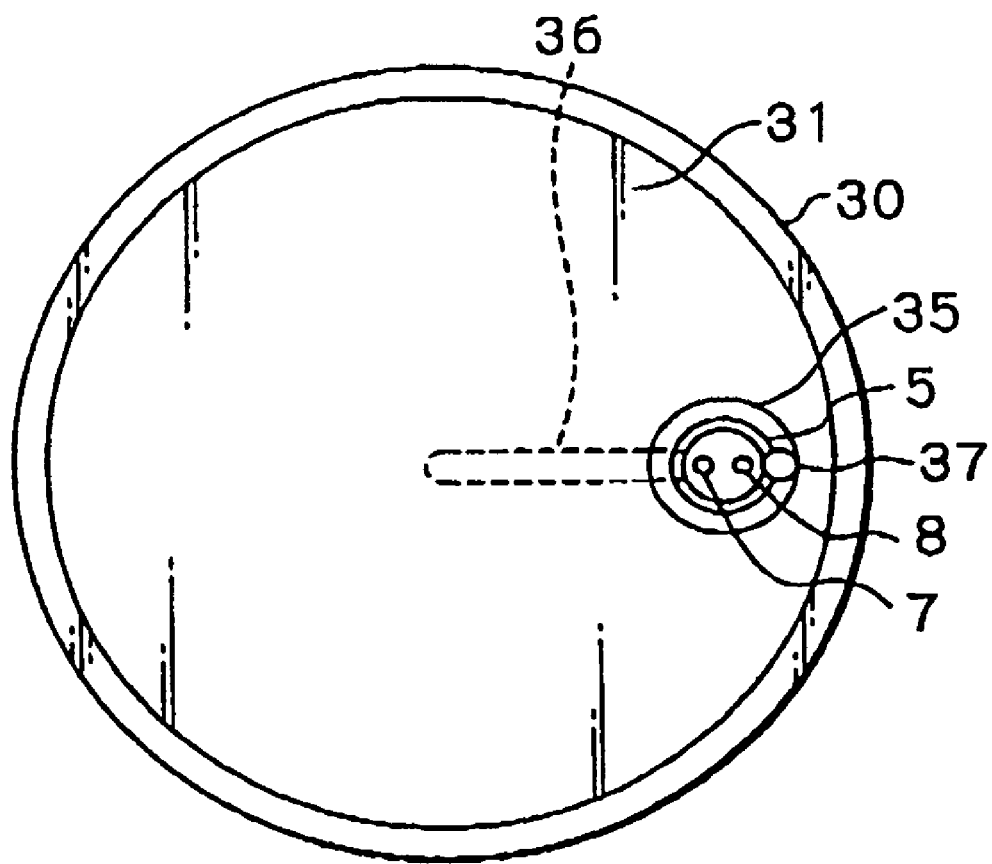
FIG. 12 shows the substrate polishing apparatus as viewed in a direction indicated by arrows Y, Y in FIG. 11.

FIGS. 11 and 12 show an example of an arrangement of a polishing apparatus for polishing a surface of a substrate according to relative movement between the substrate and a polisher, to which the substrate film thickness measurement apparatus of the present invention is applied. In this polishing apparatus, real-time detection of the film thickness can be conducted during polishing. FIG. 11 is a side view, partially in section, of the polishing apparatus. FIG. 12 shows the polishing apparatus as viewed in a direction indicated by arrows Y, Y in FIG. 11. In FIGS. 11 and 12, reference numeral 30 denotes a turntable. A polishing cloth 31 is adhered to an upper surface of the turntable 30 to form a polishing surface. Reference numeral 32 denotes a substrate holder. A substrate 33 to be polished is attached to a lower side of the wafer holder 32 and held under a predetermined pressure between the substrate holder 32 and the polishing cloth 31. Reference numeral 34 denotes a guide ring attached to an outer periphery of a lower surface of the substrate holder 32 so as to prevent displacement of the substrate 33 relative to the substrate holder 32.

The substrate holder 32 and the turntable 30 are rotatable independently of each other. An abrasive liquid is supplied from an abrasive liquid nozzle (not shown) to an upper surface of the polishing cloth 31. The surface of the substrate 33 (the surface which makes contact with the polishing cloth 31) is polished according to relative movement between the substrate 33 and the polishing cloth 31.

The jet nozzle 5 has the same arrangement as that shown in FIGS. 1 and 2. A water jet pipe 36 is connected to the jet nozzle 5. Water supplied in the form of the waterjet 4 in a supply direction from the jet nozzle 5 is recovered through a water-receiving portion 35 in a recovery direction and discharged through a discharge pipe 37. As illustrated in FIG. 11, the supply direction is parallel to the recovery direction. An upper end of the water-receiving portion 35 opens at the upper surface of the polishing cloth 31. The water jet 4 from the jet nozzle 5 forms the measurement spot 3 on the surface of the substrate 33, as in the case of FIGS. 1 and 2. In the drawings, the jet nozzle 5 is shown on a larger scale than other portions for clarity. Actually, however, the diameter of the jet nozzle 5 is small (0.4 mm to 0.7 mm) so as to enable the formation of a minute spot.

As in the case of FIGS. 1 and 2, the distal ends of the irradiation fiber 7 and the light-receiving fiber 8 are inserted into the jet nozzle 5 and are farther from the film than the distal end of nozzles. Light from the measurement calculation unit 9 is guided through the irradiation fiber 7 to the jet nozzle 5, and emitted through the water jet 4 supplied from the jet nozzle 5 to the measurement spot 3 on the surface of the substrate 33 (the surface which makes contact with the water jet 4). The light reflected by the surface of the substrate 33 passes through the water jet 4 and the light-receiving fiber 8 and is guided to the measurement calculation unit 9.

The measurement calculation unit 9 is arranged as shown in FIG. 3 or FIG. 9. Power to be supplied to the measurement calculation unit 9 and an output signal from the measurement calculation unit 9 are transmitted through a rotary connecting portion (not shown) provided on a lower end of a rotary drive shaft for the turntable 30. The output signal is transmitted to a display panel (not shown) of the polishing apparatus, which displays measurement results of the film thickness. The output signal is also transmitted to a control unit of the polishing apparatus for a control operation. The pressurized water is supplied to the water jet pipe 36 through a rotary connecting mechanism (not shown) attached to the lower end of the rotary drive shaft for the turntable 30.

Thus, by applying the substrate film thickness measurement apparatus of the present invention to the polishing apparatus, real-time and highly accurate measurement of the film thickness of the substrate can be stably conducted during polishing by means of a simple arrangement.

Figure 13:
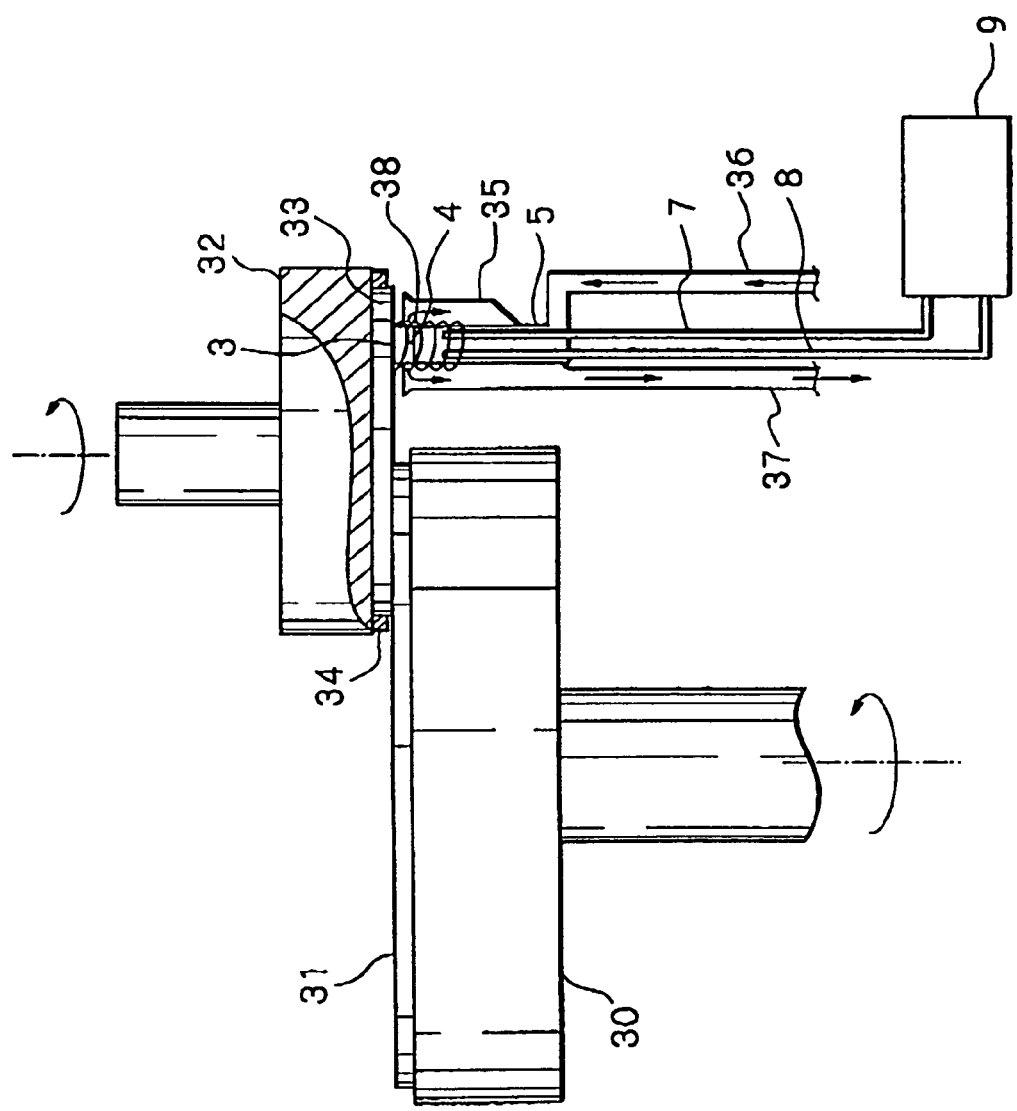
FIG. 13 shows an example of an arrangement of a substrate polishing apparatus in which a substrate film thickness measurement apparatus of the present invention is provided.

FIG. 13 is a side view, partially in section, of an example of an arrangement of a polishing apparatus to which the substrate film thickness measurement apparatus of the present invention is applied. This polishing apparatus differs from that shown in FIGS. 11 and 12 in that the jet nozzle 5 and the water-receiving portion 35 for receiving water ejected from the jet nozzle 5 are provided in the vicinity of an outer periphery of the turntable 30 so that the thickness of the film on the surface of the substrate 33 to be polished is measured outside the turntable 30. In this arrangement, polishing is temporarily stopped for measuring the film thickness of the substrate 33, or the film thickness is measured when a part of the lower side of the wafer holder 32 is separated from the upper surface of the turntable 30 while polishing is conducted.

Figure 14:
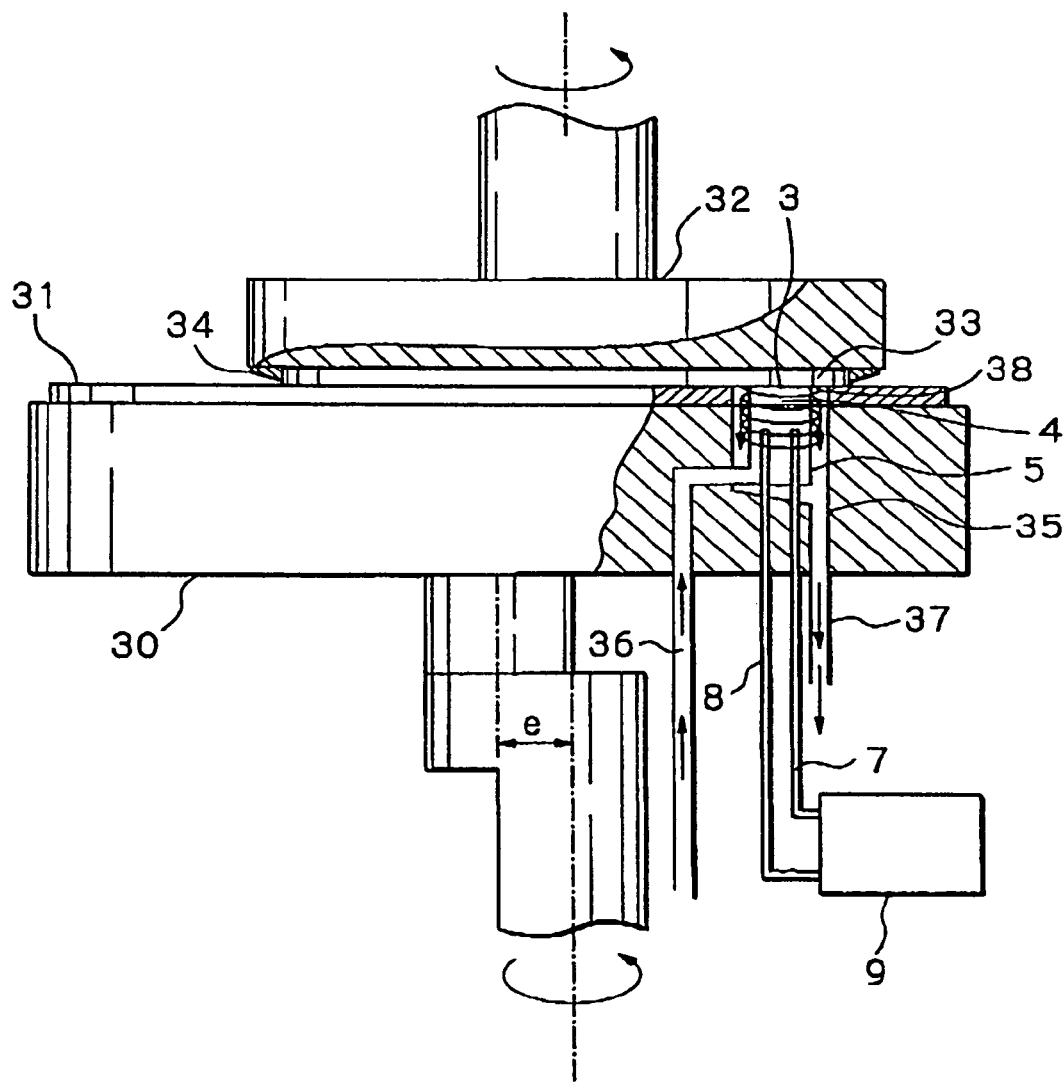
FIG. 14 shows an example of an arrangement of a substrate polishing apparatus in which a substrate film thickness measurement apparatus of the present invention is provided.

FIG. 14 is a side view, partially in section, of an example of an arrangement of a polishing apparatus to which the substrate film thickness measurement apparatus of the present invention is applied. The polishing apparatus in this example differs from those shown in FIGS. 11 and 13 in that the turntable 30 does not rotate about its axis due to the use of a non-rotary mechanism (not shown) but is subjected to a circular orbital motion while maintaining a distance e between the center axis of the turntable 30 and the axis of rotation of the drive shaft. By this arrangement, the pressurized water is directly supplied to the water jet pipe 36, not through a rotary connecting mechanism. Further, the irradiation fiber 7 and the light-receiving fiber 8 can be provided so as to extend from the measurement calculation unit 9 provided in a stationary state directly to the jet nozzle 5.

Figure 15:
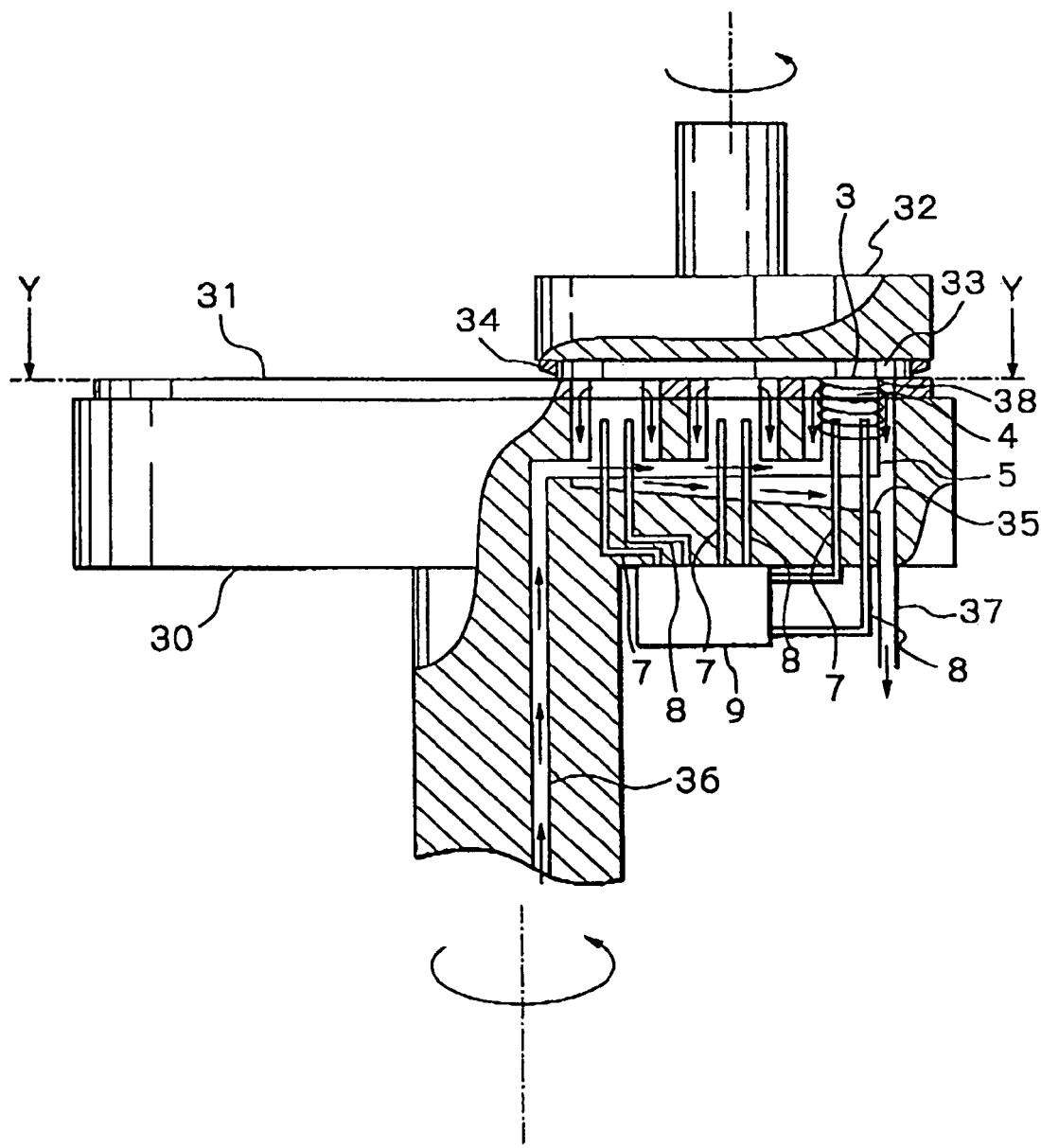
FIG. 15 shows an example of an arrangement of a substrate polishing apparatus in which a substrate film thickness measurement apparatus of the present invention is provided.
Figure 16:
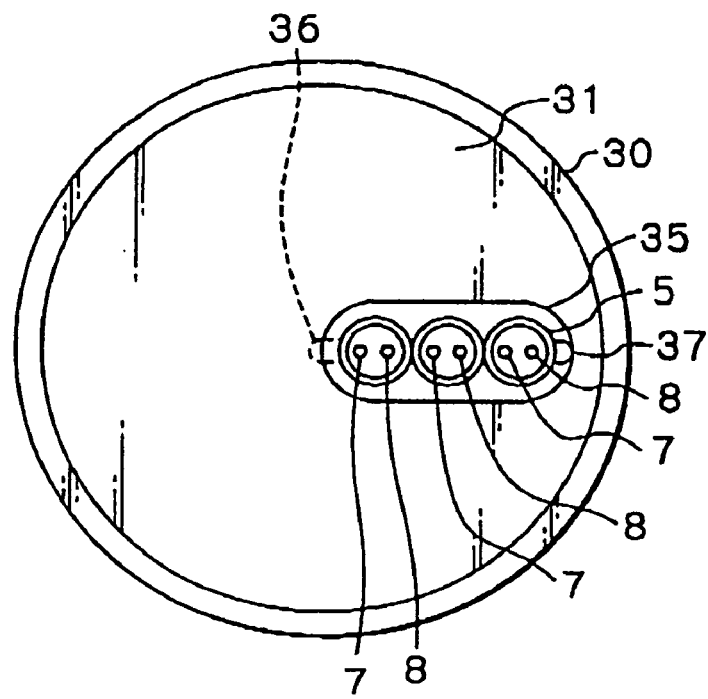
FIG. 16 shows the substrate polishing apparatus as viewed in a direction indicated by arrows Y, Y in FIG. 15.

FIGS. 15 and 16 show an example of an arrangement of a polishing apparatus to which the substrate film thickness measurement apparatus of the present invention is applied. FIG. 15 is a side view, partially in section, of the polishing apparatus. FIG. 16 shows the polishing apparatus as viewed in a direction indicated by arrows Y, Y in FIG. 15. The polishing apparatus in this example differs from that shown in FIGS. 11 and 12 in that a plurality of spots for measuring the film thickness of the substrate (three in this example) are arranged along a radius of the turntable. The polishing apparatus in this example also differs from that shown in FIGS. 11 and 12 in that three sets of the measurement apparatus, each including the jet nozzle 5, the irradiation fiber 7 and the light-receiving fiber 8, are provided respectively, so that measurement of the film thickness is conducted at a plurality of measurement spots.

In the polishing apparatus of FIGS. 15 and 16, only one measurement calculation unit 9 is provided. Light reflected at each measurement spot on the surface to be polished is guided through the water jet 4 and the light-receiving fiber 8 to the measurement calculation unit 9. The results of calculation may be outputted from the measurement calculation unit 9 in the form of a plurality of data for respective measurement spots, or may be outputted in the form of a single piece of data obtained by calculating an average of the calculation results regarding the respective measurement spots. Alternatively, a plurality of measurement calculation units 9 may be provided so that a measurement calculation unit 9 is provided for each measurement point. In other words, measurement calculation units 9 of the same quantity as that of the measurement spots may be provided so that outputs of the respective measurement calculation units 9 are compiled by the control unit of the polishing apparatus.

Figure 17:
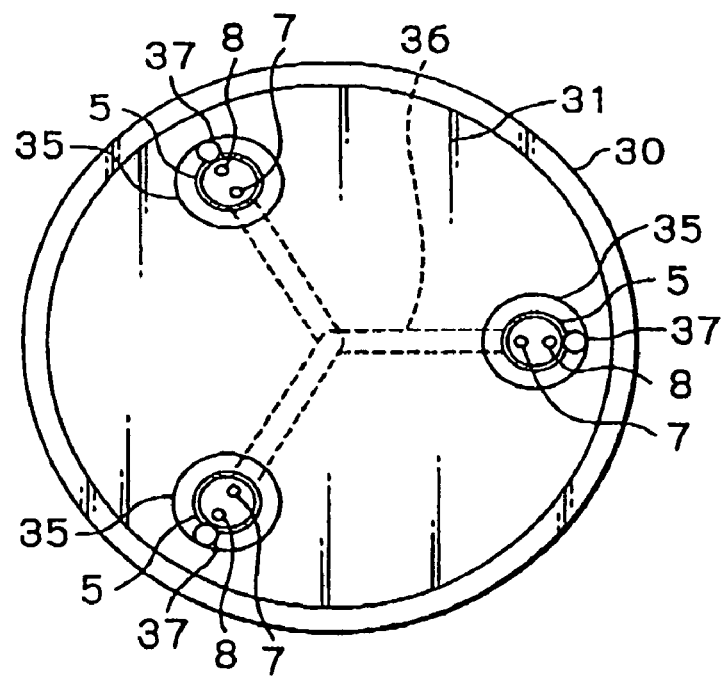
FIG. 17 shows an example of an arrangement of a substrate polishing apparatus in which a substrate film thickness measurement apparatus of the present invention is provided (a view corresponding to FIG. 16).

FIG. 17 shows an example of an arrangement of a polishing apparatus to which the substrate film thickness measurement apparatus is applied (a view corresponding to FIG. 16). This polishing apparatus differs from that of FIGS. 11 and 12 in that a plurality of measurement spots (three in this example) are arranged on the same circumferential line having a coaxial relationship to the turntable. By this arrangement, measurement of the film thickness can be conducted at a plurality of times along the same circumferential line on the turntable during one rotation of the turntable. This enables highly accurate measurement of the film thickness.

Figure 18:
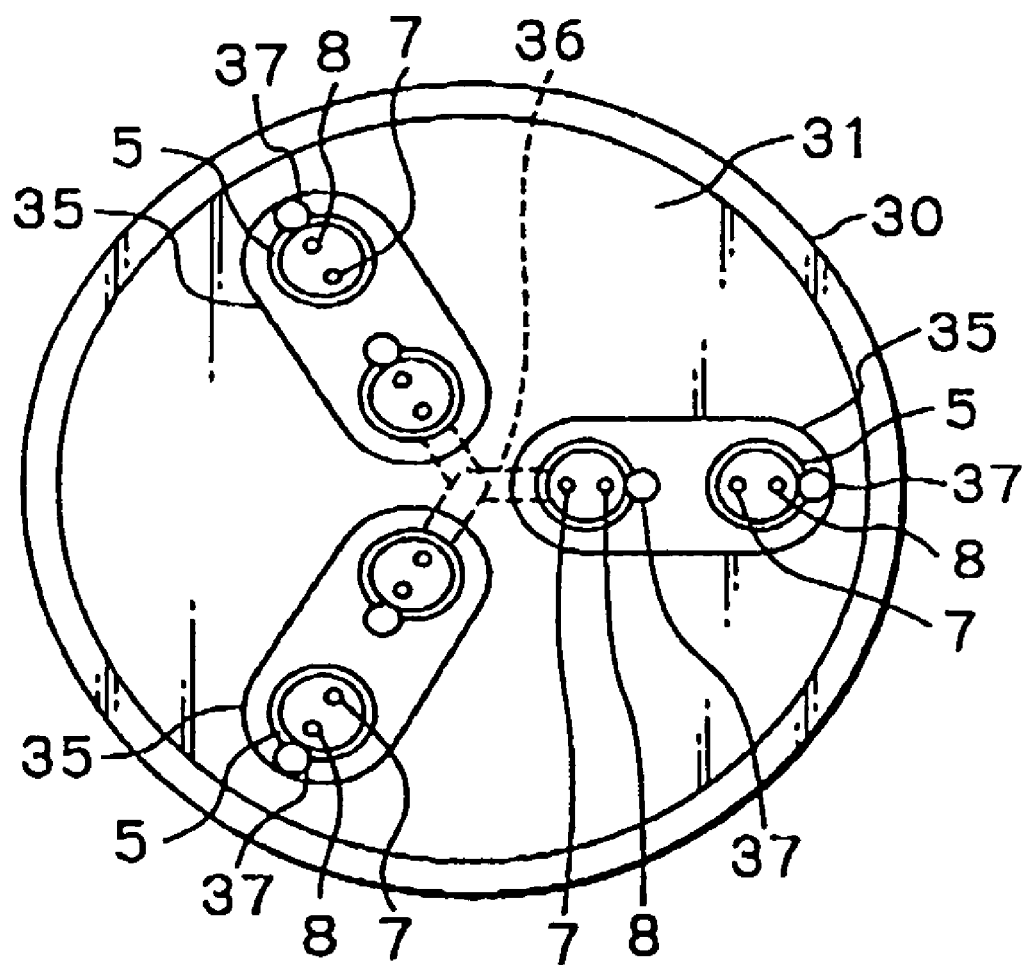
FIG. 18 shows an example of an arrangement of a substrate polishing apparatus in which a substrate film thickness measurement apparatus of the present invention is provided (a view corresponding to FIG. 16).

FIG. 18 shows an example of an arrangement of a polishing apparatus to which the substrate film thickness measurement apparatus of the present invention is applied (a view corresponding to FIG. 16). This polishing apparatus differs from that of FIGS. 11 and 12 in that a plurality of measurement spots are radially arranged (in this example, 6 spots in total are arranged with two spots being arranged along each of three radii of the turntable). This arrangement is employed, for example, when a plurality of substrate holders are moved to the turntable 30 so as to polish a plurality of substrates at the same time or when the relationship between the range or speed of pivotal movement of the wafer holder 32 and the speed of rotation of the turntable 30 exceeds a predetermined range. The reason why a plurality of measurement spots can be formed on the turntable is that in the present invention, the measurement spot can be substantially reduced in size as compared to a conventional film thickness measurement apparatus.

Figure 19:
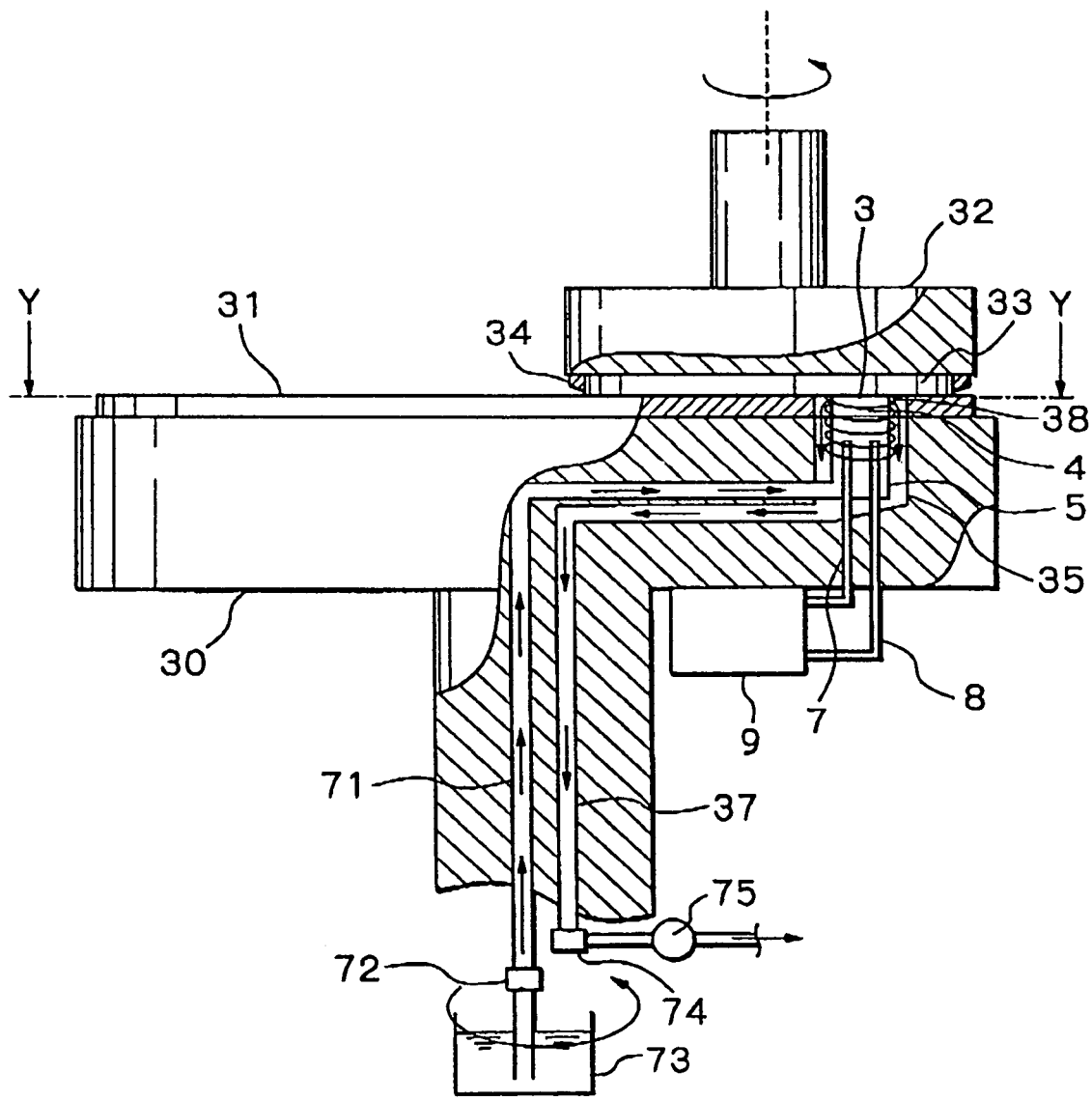
FIG. 19 shows an example of an arrangement of a substrate polishing apparatus in which a substrate film thickness measurement apparatus of the present invention is provided.

FIG. 19 is a side view, partially in section, of an example of an arrangement of a polishing apparatus to which the substrate film thickness measurement apparatus of the present invention is applied. As shown in the drawings, the water-receiving portion 35 is formed at an outer periphery of the jet nozzle 5 so as to surround the jet nozzle 5 and the water jet 4. The water-receiving portion 35 extends through the turntable 30 and the polishing cloth 31 so as to form a space for receiving water. The substrate 33 mounted on the wafer holder 32 closes an upper end of this space, so that the jet nozzle 5 and the water-receiving portion 35 are sealed off from the outside while communicating with each other. That is, the jet nozzle 5 and the water-receiving portion 35 communicate with each other through the measurement surface of the substrate 33 while they are maintained in a sealed state relative to the outside.

An end of a water supply pipe 71 is connected to the jet nozzle 5 and the other end of the water supply pipe 71 is connected to a water tank 73. The water-receiving portion 35 is connected to the discharge pipe 37, which is in turn connected to a discharge pump 75 through a rotary connecting mechanism 74.

Since the jet nozzle 5 and the water-receiving portion 35 are sealed off from the outside and communicate with each other through the measurement surface of the substrate 33, when the discharge pump 75 is operated so as to reduce the pressure in the discharge pipe 37, water supplied from the water tank 73 through the water supply pipe 71 forms a water jet and is then discharged through the discharge pipe 37. Therefore, differing from FIG. 11, it is unnecessary to supply water pressurized by a pressurizing pump (not shown) to the jet nozzle 5 through the water jet pipe 36. Further, foreign matter such as slurry which has flowed into the water-receiving portion 35 can be discharged through the discharge pipe 37.

A pressurizing pump may be provided upstream of the water supply pipe 71 so as to supply pressurized water and discharge the water through the discharge pump 75. Further, the arrangement of FIG. 19 (connecting the discharge pipe 37 to the water-receiving portion 35 and the discharge pump 75 to the discharge pipe 37) may be applied to a polishing apparatus such as shown in FIG. 14, in which the turntable 30 does not rotate about its axis but is subjected to the circular orbital motion.

Figure 20:
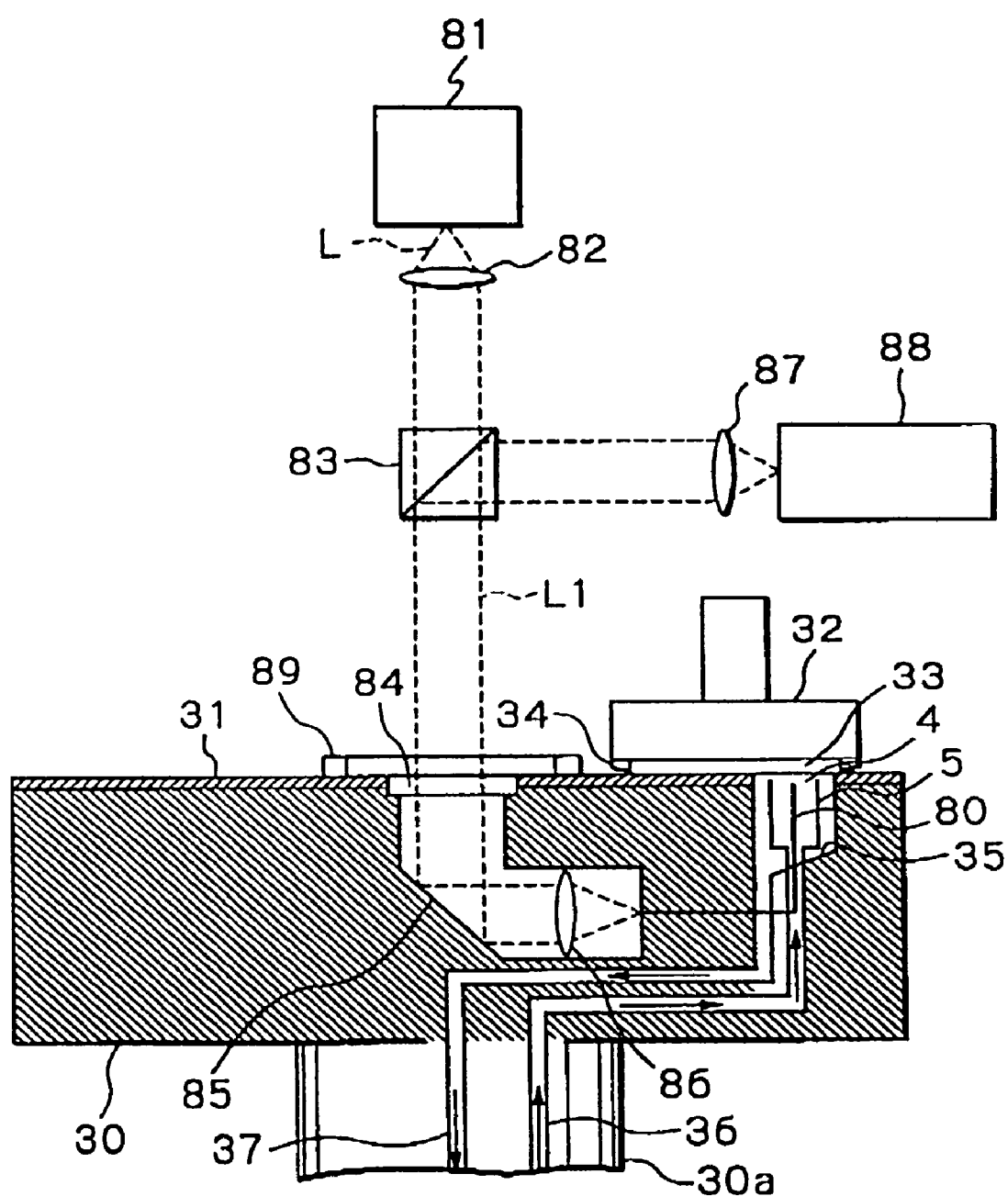
FIG. 20 shows an example of an arrangement of a substrate polishing apparatus in which a substrate film thickness measurement apparatus of the present invention is provided.

FIG. 20 is a side cross-sectional view of an example of an arrangement of a polishing apparatus to which the substrate film thickness measurement apparatus of the present invention is applied. In this polishing apparatus, a window 84 comprising an opening which has or does not have a light-transmitting member is provided at a portion of the turntable 30 corresponding to the center of rotation thereof. Light L from a light source 81 is formed into a parallel beam L1 by a first lens 82, and the parallel beam L1 is guided through a beam splitter 83 into the window 84. The beam L1 is then reflected by a mirror 85 and enters a third lens 86. The beam passes through an irradiation/light-receiving synthetic fiber 80 and the waterjet 4 from the jet nozzle 5 and is emitted to the measurement surface of the substrate 33.

The light reflected by the surface of the substrate 33 is guided through the water jet 4 and the irradiation/light-receiving synthetic fiber 80 to the third lens 86. Further, the light is guided through the mirror 85, the window 84, the beam splitter 83 and the second lens 87 to a detector 88, where measurement of the film thickness is conducted.

Thus, transmission of light between an optical system (including the mirror 85 and the third lens 86) provided within the turntable 30 and an optical system (including the first lens 82, the beam splitter 83 and the second lens 87, light source 81, and detector 88) provided outside the turntable 30 is conducted through the window 84 at the center of rotation on the upper surface of the turntable 30 (the surface on a side remote from a rotary shaft 30a). Therefore, it is unnecessary to rotate the optical system provided outside the turntable 30 synchronously with rotation of the optical system provided within the turntable 30.

For example, if the mirror 85 of the optical system within the turntable 30 is displaced from the center of rotation of the turntable 30, since the mirror 85 rotates in accordance with rotation of the turntable 30, the optical system (including the beam splitter 83) provided outside the turntable 30 must be rotated synchronously with rotation of the mirror 85 in order to conduct transmission of light between the mirror 85 and the beam splitter 83. However, in this example of the present invention, the mirror 85 is provided at the center of rotation of the turntable 30 and transmission of light is conducted through the window 84 at the center of rotation on the upper surface of the turntable 30. Therefore, it is unnecessary to rotate the optical system provided outside the turntable 30.

Further, light is transmitted in the form of the parallel beam L1 between the mirror 85 and the beam splitter 83, so that there is no problem of twisting due to rotation. Further, there is no light passing through the rotary shaft 30a, so that it is easy to conduct alignment of an optical axis. Further, only the irradiation/light-receiving synthetic fiber 80, the third lens 86 and the mirror 85 are provided within the turntable 30, so that no large space is required for installation in the turntable 30, and it is unnecessary to balance the turntable 30 as a whole.

When the window 84 is an opening having no light-transmitting member, in order to prevent entry of slurry into the opening, a dam-like member 89 is formed around the window 84. Instead of the dam-like member 89, a groove may be formed around the window 84 so as to receive a flow of slurry. When the window 84 includes the light-transmitting member, entry of slurry can be prevented by providing the light-transmitting member at a higher position than the upper surface of the turntable 30.

In the substrate film thickness measurement apparatuses of the above examples, the water jet 4 is supplied from the jet nozzle 5. However, a liquid other than water may be supplied from the jet nozzle 5, as long as the liquid is capable of transmitting light. That is, a light-transmitting liquid other than water may be ejected from the jet nozzle 5 so as to form a flow of the light-transmitting liquid in a cylindrical form. Further, the jet nozzle 5 may not necessarily be provided as a nozzle exclusively used for measurement of the film thickness. For example, a nozzle which ejects a cleaning liquid for cleaning a substrate may be used so that light is transmitted through a jet of cleaning liquid supplied onto the measurement surface of the substrate and the light reflected by the measurement surface is guided through the jet of cleaning liquid to the measurement calculation unit 9.

In the above-mentioned examples, the turntable 30 having the polishing cloth 31 adhered thereto and the wafer holder 32 are used, and the substrate 33 is held between the wafer holder 32 and the polishing cloth 31, so as to polish the substrate 33 in accordance with relative movement between the substrate 33 and the polishing cloth 31. However, this does not limit the arrangement of the polishing apparatus in the present invention. For example, an abrasive plate may be attached to the upper surface of the turntable 30 so as to polish the substrate in accordance with relative movement between the abrasive plate and the substrate. The arrangement of the polishing apparatus is not particularly limited, as long as it is capable of polishing the surface of the substrate in accordance with relative movement between the substrate and a polisher. When the substrate film thickness measurement apparatus of the present invention is applied to the polishing apparatus having the above-mentioned arrangement, real-time and highly accurate measurement of the film thickness of the substrate can be stably conducted during polishing.

Figure 23:
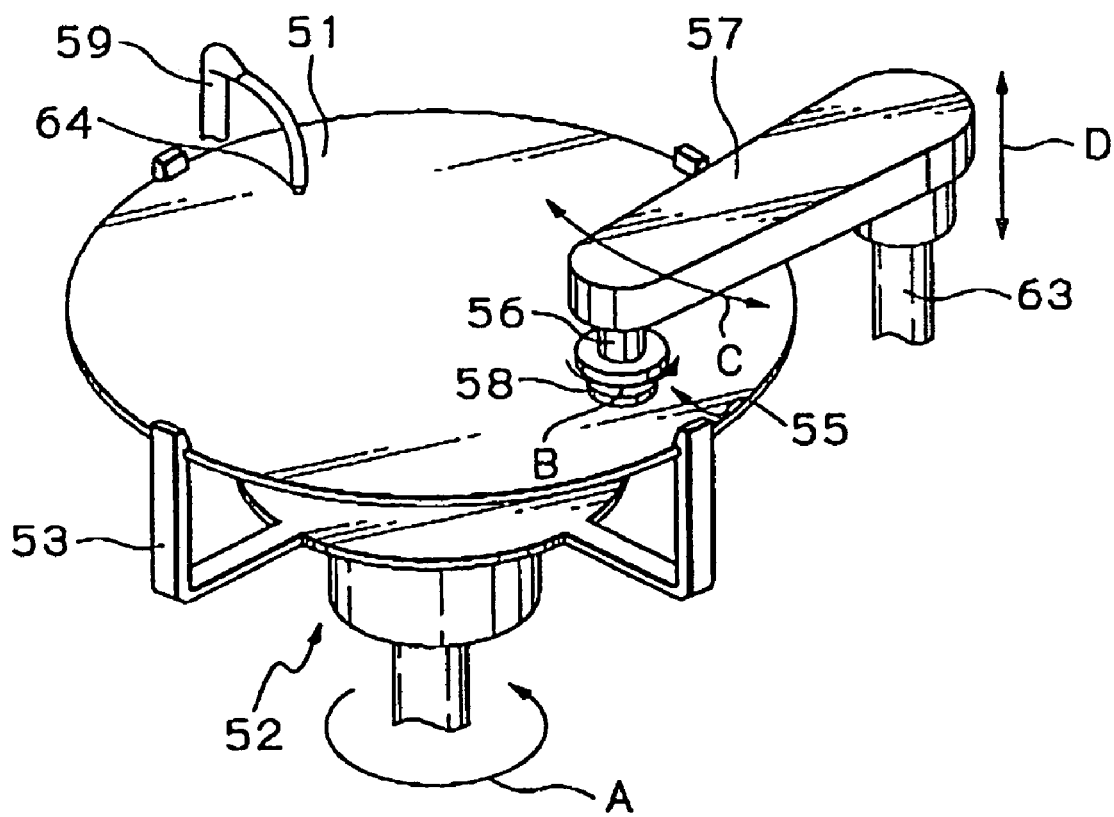
FIG. 23 shows an example of an arrangement of a substrate cleaning apparatus in which a substrate film thickness measurement apparatus of the present invention is provided.

FIG. 23 shows an example of an arrangement of a substrate cleaning apparatus to which the substrate film thickness measurement apparatus of the present invention is applied. Reference numeral 51 denotes a substrate such as a semiconductor wafer. The substrate 51 includes a thin film formed thereon, which film is to be measured. The substrate 51 is held by a substrate holding mechanism 52 having a plurality of substrate holding members 53 such that the thin film formed on the substrate 51 faces upward, and is rotated in a direction indicated by an arrow A in FIG. 23. Reference numeral 55 denotes a pencil type cleaning device. The pencil type cleaning device 55 is supported by an arm 57 through a rotary shaft 56, and rotated in a direction indicated by an arrow B in FIG. 23. A cleaning member 58 such as a sponge is connected to a distal end of the cleaning device 55.

Figure 24:
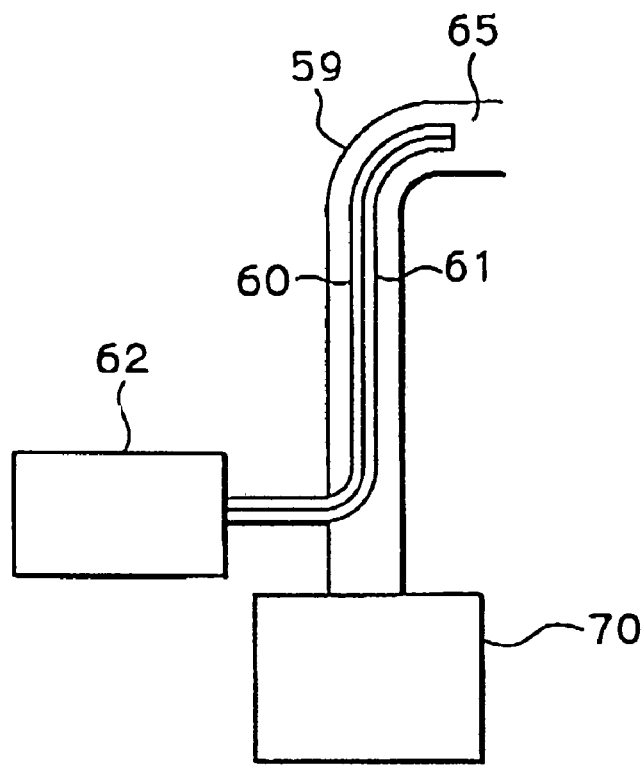
FIG. 24 shows an arrangement of an interior of a cleaning liquid nozzle of the substrate cleaning apparatus of FIG. 23.

Reference numeral 59 denotes a cleaning liquid nozzle. As shown in FIG. 24, an irradiation fiber 60 and a light-receiving fiber 61 are inserted into the cleaning liquid nozzle 59. The irradiation fiber 60 and the light-receiving fiber 61 are connected to a measurement calculation unit 62. The arm 57 is pivotally moved about a supporting shaft 63 in a direction indicated by a double-headed arrow C in FIG. 23. The arm 57 is also vertically movable as indicated by a double-headed arrow D in FIG. 23.

In this substrate cleaning apparatus, a light-transmitting cleaning liquid (mainly water) is ejected from the cleaning liquid nozzle 59. While the cleaning device 55 which is rotating is pivotally moved, the cleaning device 55 is pressed against an upper surface of the substrate 51, to thereby conduct cleaning. The cleaning liquid ejected from the cleaning liquid nozzle 59 forms a measurement spot 64 on the upper surface of the substrate. Light is emitted from the measurement calculation unit 62 through the irradiation fiber 60 and a cleaning liquid flow 65 to the thin film on the substrate 51 in the measurement spot 64. The light reflected by the thin film is guided through the cleaning liquid flow 65 and the light-receiving fiber 61 to the measurement calculation unit 62. By this arrangement, the thickness of the thin film formed on the substrate 51 (or, if desired, the presence or absence of the film on the substrate 51) can be measured by the measurement calculation unit 62 during cleaning. In FIG. 24, reference numeral 70 denotes a cleaning liquid pump for supplying the cleaning liquid to the cleaning liquid nozzle 59.

Figure 25:
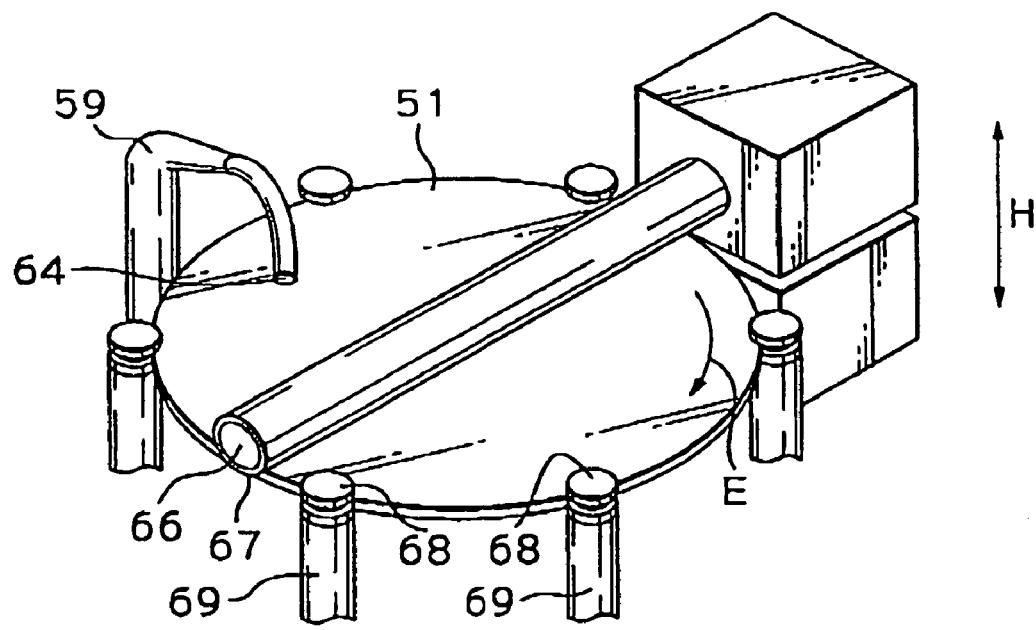
FIG. 25 shows an example of an arrangement of a substrate cleaning apparatus in which a substrate film thickness measurement apparatus of the present invention is provided.

FIG. 25 shows an example of an arrangement of a substrate cleaning apparatus to which the substrate film thickness measurement apparatus of the present invention is applied. This substrate cleaning apparatus comprises a rotatable roll type cleaning device 66 which has a cleaning member 67, such as a sponge, provided on an outer circumferential surface thereof. The substrate 51 is held by a plurality of spindles 69 each having a spinning top 68, and rotated in a direction indicated by an arrow E in FIG. 25. The cleaning device 66 which is rotating is pressed against the substrate 51 which is also rotating, and cleaning of the upper surface of the substrate 51 is conducted while the cleaning liquid is ejected from the cleaning liquid nozzle 59.

As shown in FIG. 24, the irradiation fiber 60 and the light-receiving fiber 61 are inserted into the cleaning liquid nozzle 59. The irradiation fiber 60 and the light-receiving fiber 61 are connected to the measurement calculation unit 62. The cleaning liquid ejected from the cleaning liquid nozzle 59 forms the measurement spot 64 on the upper surface of the substrate. Light is emitted from the measurement calculation unit 62 through the irradiation fiber 60 and the cleaning liquid flow 65 to the thin film on the substrate 51 in the measurement spot 64. The light reflected by the thin film is guided through the cleaning liquid flow 65 and the light-receiving fiber 61 to the measurement calculation unit 62. Thus, as in the case of the substrate cleaning apparatus of FIG. 23, the thickness of the thin film formed on the substrate 51 (or the presence or absence of the film on the substrate 51) can be measured during cleaning.

In the substrate cleaning apparatuses of FIGS. 23 and 25, the substrate film thickness measurement apparatuses having arrangements shown in FIGS. 1 and 2 are provided. However, this does not limit the present invention. The substrate film thickness measurement apparatuses having arrangements shown in FIGS. 4 and 10 may be provided in the substrate cleaning apparatuses of FIGS. 23 and 25.

Figure 26:
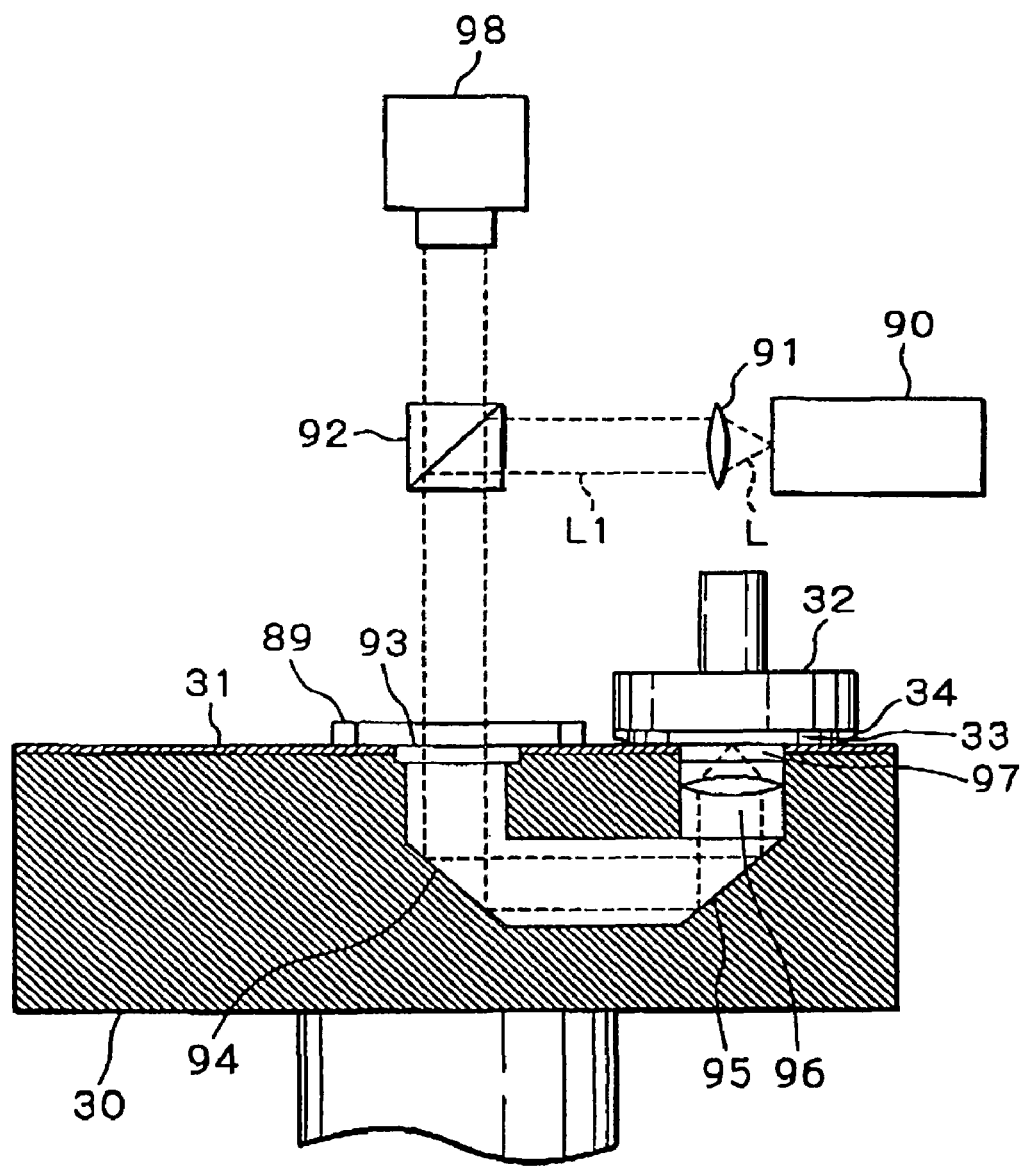
FIG. 26 shows an example of an arrangement of a substrate processing apparatus of the present invention.

FIG. 26 shows an example of an arrangement of a substrate processing apparatus to which the substrate film thickness measurement apparatus of the present invention is applied. This substrate processing apparatus comprises the turntable 30 and the wafer holder 32. The substrate 33 is subjected to processing, such as polishing, by pressing the substrate 33 held by the wafer holder 32 against the polishing cloth 31 on the turntable 30. Light L from a light source 90 is formed into the parallel beam L1 by a first lens 91 and passes through a beam splitter 92. The light then enters a window 93 provided on the turntable 30 at a position corresponding to the center of rotation of the turntable 30 on a side opposite to the drive shaft. The window 93 comprises an opening which has or does not have a light-transmitting member. The parallel beam L1 is reflected by a first mirror 94 and a second mirror 95, and passes through a second lens 96 and the window 97. The beam is emitted from the window 97 so as to focus on the surface of the substrate 33 on a side to be polished.

The light reflected by the surface of the substrate 33 passes through the second lens 96 and is reflected by the second mirror 95 and the first mirror 94. The light then passes through the window 93 and the beam splitter 92 and enters a CCD camera 98. The CCD camera 98 processes the reflected light and takes an image of the surface of the substrate 33. The CCD camera 98 quickly detects particles on the surface of the substrate 33 or makes an observation with regard to a condition of the surface of the substrate 33, such as cracking of the substrate 33.

When the substrate film thickness measurement apparatus of the present invention is applied to an apparatus for forming a film on a substrate, such as a CVD apparatus or a plating apparatus, or a substrate processing apparatus for polishing or removing the film formed on the substrate, it is possible to measure the thickness of the film formed on the substrate, or detect or observe a condition of the substrate, such as the presence or absence of the film on the substrate. Especially, in the substrate processing apparatus, when use is made of a conventional means to eject a processing liquid for ejecting a light-transmitting cleaning liquid or other various processing liquids onto the substrate, measurement of the film thickness or detection or observation of the presence or absence of the film can be easily and quickly conducted by using such means.

As is apparent from the above, the present invention is advantageous in the following points.

When the length of a jet of a light-transmitting liquid supplied onto a measurement surface of the substrate is small, the diameter of the jet of liquid is substantially uniform. Therefore, the size of a measurement spot formed on the measurement surface is determined, regardless of the distance between a position from which the liquid is ejected (e.g. a tip of the nozzle) and the measurement surface. Thus the need to strictly control the above-mentioned distance is eliminated and highly accurate measurement of the film thickness can be achieved. When use is made of a means such as a conventional nozzle to supply a cylindrical jet of light-transmitting liquid such as water or a chemical onto the measurement surface, the film thickness can be measured by utilizing a jet of the light-transmitting liquid formed by such a means. Therefore, the apparatus does not need to be modified to a large extent, and real-time measurement of the film thickness of the substrate can be conducted during processing.

It is unnecessary to control the distance between the distal end of the optical fiber and the position from which the water is ejected and the measurement surface. Further, highly accurate measurement of the film thickness can be conducted.

It is unnecessary to control the distance between the lens and the position from which the water is ejected and the measurement surface, and highly accurate measurement of the film thickness can be achieved. Further, the optical fiber for irradiation and the optical fiber for receiving light are not inserted into a flow of light-transmitting liquid, so that it is possible to prevent deformation of the flow of light-transmitting liquid.

By operating the discharge pump, the pressure in the discharge pipe is reduced and the light-transmitting liquid flows into the light-transmitting liquid nozzle through the supply pipe. Thus, the light-transmitting liquid is supplied in a cylindrical jet form from the nozzle and makes contact with the measurement surface of the substrate, and flows into the discharge pipe through the light transmitting liquid-receiving portion. Therefore, it is possible to form a cylindrical jet of light-transmitting liquid for measurement of the film thickness, without using a pressurizing pump. Foreign matter such as slurry which has flowed into the light transmitting liquid-receiving portion is discharged through the discharge pipe.

Real-time measurement of the film thickness can be conducted during processing, without causing any damage to the measurement surface of the substrate being processed. When measurement of the film thickness can be conducted in an operation for removal of a surface layer, which is an object of the use of CMP, an endpoint for removal of the surface layer, that is, a time point at which the thickness of the surface layer becomes zero, can be detected.

The turntable can be mechanically separated from a mechanism provided outside the table while an optical connection therebetween can be maintained. Therefore, it is unnecessary to rotate the optical system provided outside the turntable synchronously with rotation of the optical system provided within the turntable, so that an apparatus having a simple arrangement can be obtained.

What is claimed is:

1. A method of measuring a thickness of a film on a substrate, said method comprising:
   supplying a jet of light-transmitting liquid through a nozzle towards the film;
   emitting light from at least one optical fiber arranged within the nozzle so that the light travels through the light-transmitting liquid towards the film and is reflected by a surface of the film, wherein a distal end of the nozzle is closer to the film than a distal end of the at least one optical fiber;
   receiving the light reflected from the film and passing through the light-transmitting liquid into the distal end of the at least one optical fiber arranged within the nozzle; and
   measuring the thickness of the film based on the light reflected by the film.

2. The method of claim 1, wherein the nozzle is positioned so as to form a gap between the distal end of the nozzle and the surface of the film.

3. The method of claim 1, wherein the at least one optical fiber comprises a light-emitting optical fiber having a distal end for emitting the light, and comprises a light-receiving optical fiber having a distal end for receiving the light, wherein the distal end of the nozzle is closer to the film than the distal end of each of the light-emitting optical fiber and the light-receiving optical fiber.

4. The method of claim 1, wherein the at least one optical fiber comprises a single light-emitting/light-receiving optical fiber having a distal end for emitting and receiving the light, wherein the distal end of the nozzle is closer to the film than the distal end of the light-emitting/light-receiving optical fiber.

5. The method of claim 1, wherein an inner surface of the nozzle has a mirror finish.

6. An apparatus for measuring a thickness of a film on a substrate, said apparatus comprising:
   a conduit for supplying a jet of light-transmitting liquid from a distal end thereof towards the film; and
   at least one optical fiber arranged within said conduit for emitting light towards the film through the light-transmitting liquid, and for receiving the light reflected from a surface of the film and passing through the light-transmitting liquid, wherein a distal end of said conduit is closer to the surface of the film than a distal end of said at least one optical fiber, and wherein said at least one optical fiber is connected to a component for measuring a thickness of the film based on the light reflected from the surface of the film.

7. The apparatus of claim 6, wherein said conduit is arranged so as to form a gap between said distal end of said conduit and a plane of the surface of the film.

8. The apparatus of claim 6, wherein said at least one optical fiber comprises a light-emitting optical fiber having a distal end arranged within said conduit so as to direct the light towards the film through the light-transmitting liquid, and comprises a light-receiving optical fiber having a distal end arranged within said conduit so as to receive the light reflected from the surface of the film and passing through the light-transmitting liquid, said distal end of said conduit being closer to the film than said distal end of each of said light-emitting optical fiber and said light-receiving optical fiber.

9. The apparatus of claim 6, wherein said at least one optical fiber comprises a single light-emitting/light-transmitting optical fiber having a distal end arranged within said conduit so as to emit light toward the film and so as to receive the light reflected from the surface of the film, said distal end of said conduit being closer to the film than said distal end of said light-emitting/light-transmitting optical fiber.

10. The apparatus of claim 6, wherein said conduit comprises a first conduit for supplying the light-transmitting liquid, further comprising a second conduit for recovering the light-transmitting liquid, said first conduit being arranged within said second conduit such that the light-transmitting liquid flowing through said first conduit is separated from the light-transmitting liquid flowing through said second conduit by a wall of said first conduit.

11. The apparatus of claim 6, wherein an inner surface of said conduit has a mirror finish.

12. An apparatus for treating a substrate having a film on a surface of the substrate, said apparatus comprising:
   a holder for holding the substrate; and
   a film thickness measurement device for measuring a thickness of the film formed on the substrate, said film thickness measurement device comprising:
      a conduit for supplying a jet of light-transmitting liquid from a distal end thereof towards the film; and
      at least one optical fiber arranged within said conduit for emitting light towards the film through the light-transmitting liquid, and for receiving the light reflected from a surface of the film and passing through the light-transmitting liquid, wherein a distal end of said conduit is closer to the surface of the film than a distal end of said at least one optical fiber, and wherein said at least one optical fiber is connected to a component for measuring a thickness of the film based on the light reflected from the surface of the film.

13. The apparatus of claim 12, wherein said conduit is arranged so as to form a gap between said distal end of said conduit and a plane of the surface of the film.

14. The apparatus of claim 12, wherein said at least one optical fiber comprises a light-emitting optical fiber having a distal end arranged within said conduit so as to direct the light towards the film through the light-transmitting liquid, and comprises a light-receiving optical fiber having a distal end arranged within said conduit so as to receive the light reflected from the surface of the film and passing through the light-transmitting liquid, said distal end of said conduit being closer to the film than said distal end of each of said light-emitting optical fiber and said light-receiving optical fiber.

15. The apparatus of claim 12, wherein said at least one optical fiber comprises a single light-emitting/light-transmitting optical fiber having a distal end arranged within said conduit so as to emit light toward the film and so as to receive the light reflected from the surface of the film, said distal end of said conduit being closer to the film than said distal end of said light-emitting/light-transmitting optical fiber.

16. The apparatus of claim 12, wherein said conduit comprises a first conduit for supplying the light-transmitting liquid, further comprising a second conduit for recovering the light-transmitting liquid, said first conduit being arranged within said second conduit such that the light-transmitting liquid flowing through said first conduit is separated from the light-transmitting liquid flowing through said second conduit by only an outer wall of said first conduit.

17. The apparatus of claim 12, further comprising a turntable having a polishing surface, said holder being operable to hold the substrate in contact with said polishing surface to polish the substrate, said conduit being arranged to extend through said turntable.

18. The apparatus of claim 12, wherein an inner surface of said conduit has a mirror finish.

* * * * *